United States Patent
Miyasaka et al.

(10) Patent No.: US 6,753,862 B1
(45) Date of Patent: Jun. 22, 2004

(54) OUTLINE SMOOTHING METHOD AND SYSTEM

(75) Inventors: Noriaki Miyasaka, Okaya (JP); Shigekazu Yanagisawa, Matsumoto (JP); Ryuji Omoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 443 days.

(21) Appl. No.: 09/684,799

(22) Filed: Oct. 6, 2000

(30) Foreign Application Priority Data

Oct. 7, 1999 (JP) .......................................... 11-287218

(51) Int. Cl.[7] .............................. G06T 11/00; G09G 5/24
(52) U.S. Cl. ................................. 345/472; 345/469.1
(58) Field of Search ............................. 345/472, 469.1, 345/472.1, 472.2, 472.3, 471

(56) References Cited

U.S. PATENT DOCUMENTS

| | | | | |
|---|---|---|---|---|
| 4,607,340 A | * | 8/1986 | Nagai ......................... | 345/443 |
| 4,777,651 A | * | 10/1988 | McCann et al. ............. | 382/242 |
| 5,027,304 A | * | 6/1991 | Jeng et al. ................... | 345/170 |
| 5,233,685 A | * | 8/1993 | Landes et al. .............. | 715/542 |
| 5,274,752 A | * | 12/1993 | Kawazome ................. | 345/619 |
| 5,428,728 A | * | 6/1995 | Lung et al. ................. | 345/469 |
| 5,475,807 A | * | 12/1995 | Yoshida et al. ............. | 345/170 |
| 5,600,772 A | * | 2/1997 | Zhou et al. ................. | 345/170 |
| 5,857,067 A | * | 1/1999 | Hassett et al. ........... | 345/469.1 |
| 5,946,001 A | * | 8/1999 | Isaka .......................... | 345/470 |
| 6,126,342 A | * | 10/2000 | Kurumida .................... | 400/76 |
| 6,226,400 B1 | * | 5/2001 | Doll ............................ | 382/163 |
| 6,504,543 B1 | * | 1/2003 | Okamoto et al. .......... | 345/441 |

FOREIGN PATENT DOCUMENTS

| | | |
|---|---|---|
| JP | 5-011737 | 1/1993 |
| JP | 5-330145 | 12/1993 |
| JP | 7-225845 | 8/1995 |

* cited by examiner

Primary Examiner—Michael Razavi
Assistant Examiner—Ryan Yang
(74) Attorney, Agent, or Firm—Hogan & Hartson, LLP

(57) ABSTRACT

There is provided an method for a character-outputting apparatus which is capable of storing a character image defined by a character font, as bitmap data in the form of a dot matrix, and printing or displaying the character image. The bitmap data is converted temporarily to vector data when the character image is enlarged. Then a new line is drawn from a starting point of each vector of the vector data to an ending point of the vector in a vector direction, where is included a diagonal discontinuity between dots diagonally adjacent to each other, and an inside of the new line is filled to thereby regenerate bitmap data corresponding to the character image.

6 Claims, 51 Drawing Sheets

BIT MAP

VECTORIZED DOT INFORMATION

F I G. 2
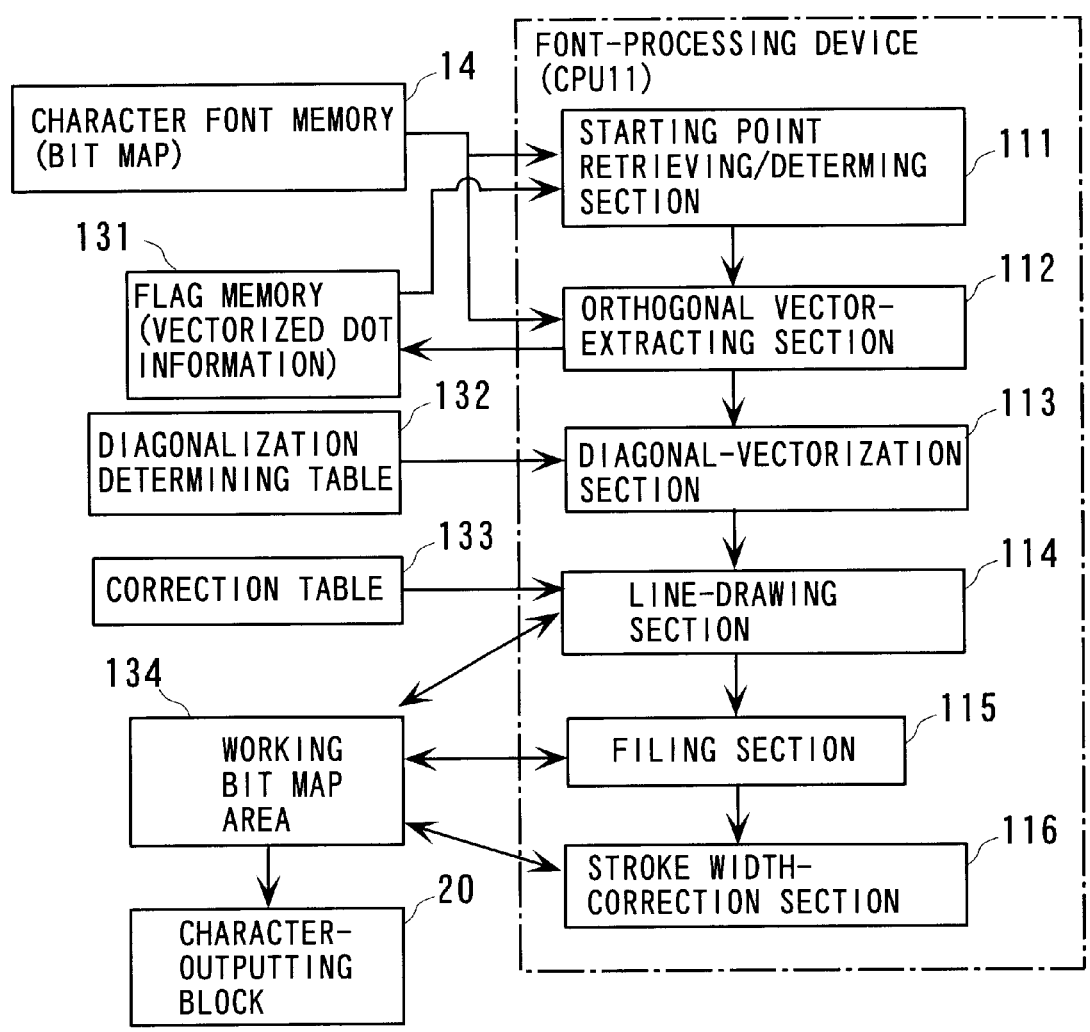

FIG. 3B1
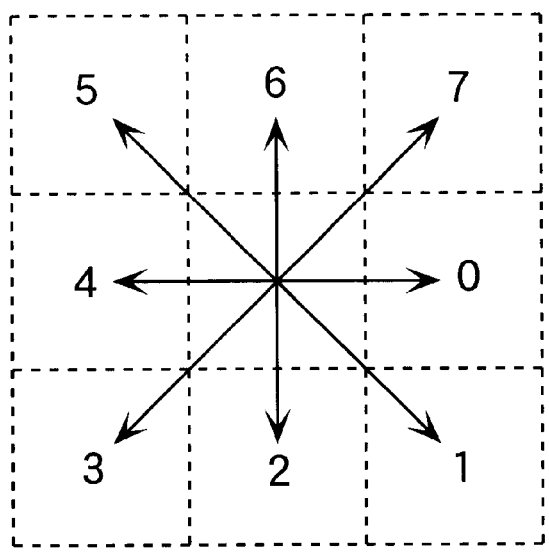
FIG. 3B2
| VECTOR NUMBER | 0 | 1 | 2 | 3 | 4 | 5 | 6 | 7 |
|---|---|---|---|---|---|---|---|---|
| SYMBOL | → | ╲ | ↓ | ╱ | ← | ╲ | ↑ | ╱ |

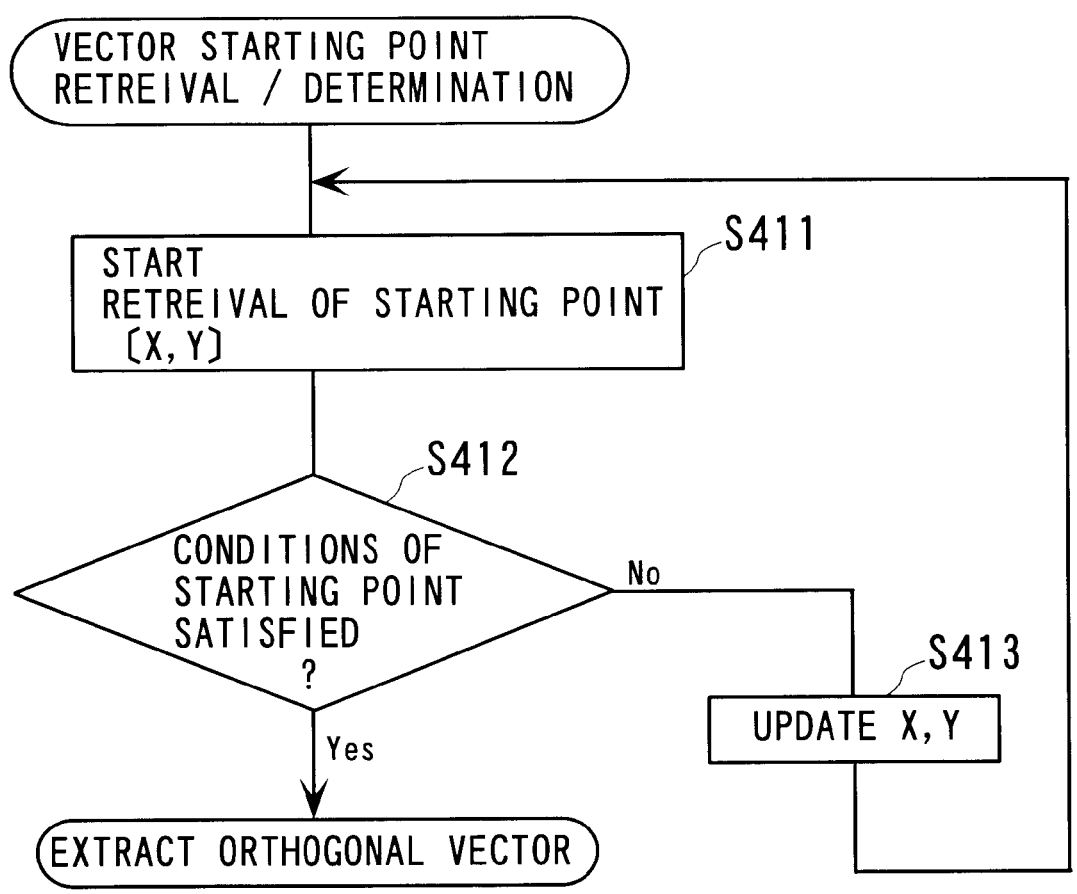
F I G. 5

F I G. 1 2

⟨TABLE 1⟩

| CONDITION | | VECTOR VALUE<br>VALUES IN ( ) ARE<br>VECTOR NUMBERS | REMARKS |
|---|---|---|---|
| DOT AT<br>THE UPPER LEFT OF<br>STARTING POINAT | PRE-<br>SENT | ← (4) | VECTORIZE<br>INNER PERIPHERY<br>OF BIT MAP DATA |
| | AB-<br>SENT | → (0) | VECTORIZE<br>OUTER PERIPHERY<br>OF BIT MAP DATA |

F I G. 1 3

⟨TABLE 2⟩

| IMMEDIATELY PRECEEDING VECTOR | RITREIVAL ORDER 1 | RITREIVAL ORDER 2 | RITREIVAL ORDER 3 |
|---|---|---|---|
| RIGHTWARD → (0) | UPWARD VECTOR PATTERN | RIGHTWARD VECTOR PATTERN | DOWNWARD VECTOR PATTERN |
| DOWNWARD ↓ (2) | LEFTWARD VECTOR PATTERN | DOWNWARD VECTOR PATTERN | LEFTWARD VECTOR PATTERN |
| LEFTWARD ← (4) | DOWNWARD VECTOR PATTERN | LEFTWARD VECTOR PATTERN | UPWARD VECTOR PATTERN |
| UPWARD ↑ (6) | LEFTWARD VECTOR PATTERN | UPWARD VECTOR PATTERN | RIGHTWARD VECTOR PATTERN |

F I G. 1 4

⟨TABLE 3⟩

| RETRIEVAL DIRECTION PATTERN | CONDITION | PICTRIAL REPRESENTA- TION | VECTOR |
|---|---|---|---|
| RIGHTWARD VECTOR PATTERN | PRESENT DOT = BLACK<br>UPPER DOT = WHITE | | → (0) |
| DOWNWARD VECTOR PATTERN | PRESENT DOT = WHITE<br>LEFT DOT = BLACK | | ↓ (2) |
| LEFTWARD VECTOR PATTERN | LEFT DOT = WHITE<br>UPPER LEFT DOT = BLACK | | ← (4) |
| UPWARD VECTOR PATTERN | UPPER DOT = BLACK<br>UPPER LEFT DOT = WHITE | | ↑ (6) |

F I G. 1 5

⟨TABLE 4⟩

| VECTOR | COORDINATE SHIFT FOR VECTORIZATION |
|---|---|
| RIGHTWARD → (0) | X DIRECTION + 1, Y DIRECTION + 0 |
| DOWNWARD ↓ (2) | X DIRECTION + 0, Y DIRECTION + 1 |
| LEFTWARD ← (4) | X DIRECTION - 1, Y DIRECTION + 0 |
| UPWARD ↑ (6) | X DIRECTION + 0, Y DIRECTION - 1 |

FIG. 16A

WHEN FIRST STARTING POINT IS DETERMINED (STARTING POINT [6.2])

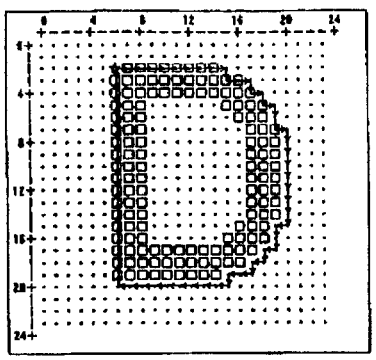

ORTHOGONAL VECTOR DATA

↑VCT1=[→,→,→,→,→,→,→,→,→,↓,→,→,↓,→,↓,→,
↓,↓,→,↓,↓,↓,↓,↓,↓,↓,↓,↓,↓,↓,↓,↓,↓,↓,
←,↓,←,←,↓,←,←,←,←,←,←,←,←,←,←,↑,↑,
↑,↑,↑,↑,↑,↑,↑,↑,↑,↑,↑,↑,↑,↑,↑]

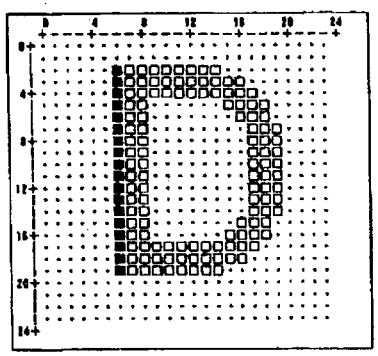

VECTORIZED DOT INFORMATION OBTAINED WHEN CONVERSION TO ORTHOGONAL VECTOR DATA IS TERMINATED

FIG. 16B

WHEN SECOND STARTING POINT IS DETERMINED (STARTING POINT [15.5])

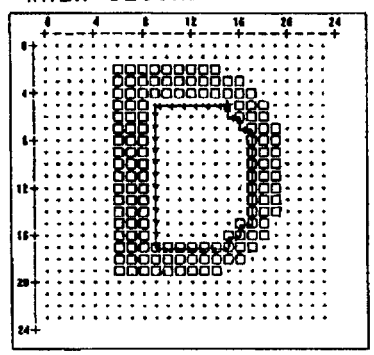

ORTHOGONAL VECTOR DATA

↑VCT2=[←,←,←,←,←,←,←,↓,↓,↓,↓,↓,↓,↓,↓,↓,↓,
↓,↓,→,→,→,→,→,→,↑,→,↑,→,↑,↑,↑,↑,
↑,↑,↑,↑,←,↑,←,↑]

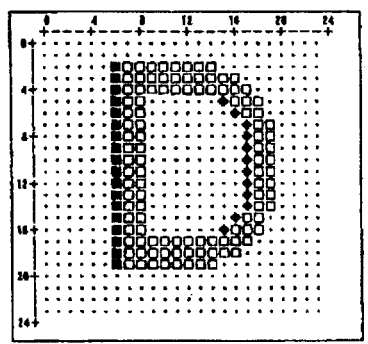

VECTORIZED DOT INFORMATION OBTAINED WHEN CONVERSION TO ORTHOGONAL VECTOR DATA IS TERMINATED

F I G. 1 7

| DIRECTION OF CHANGE FROM ONE VECTOR TO NEXT | VCT[N] | VCT[N+1] |
|---|---|---|
| LEFT | → | ↑ |
| | ↓ | → |
| | ← | ↓ |
| | ↑ | ← |
| RIGHT | → | ↓ |
| | ↓ | ← |
| | ← | ↑ |
| | ↑ | → |

F I G. 18

| DIRECTION OF CHANGE FROM ONE VECTOR TO NEXT | VCT[N] | VCT[N+1] | DIAGONAL VECTOR OBTAINED BY CONVERSION |
|---|---|---|---|
| LEFT | ↑ | ← | RIGHTWARD UPWARD VECTOR |
| | → | ↑ | RIGHTWARD DOWNWARD VECTOR |
| | ↓ | → | LEFTWARD DOWNWARD VECTOR |
| | ← | ↓ | LEFTWARD UPWARD VECTOR |

FIG. 19

⟨TABLE 7⟩

| | | | | V1→V2 ||||||||
|---|---|---|---|---|---|---|---|---|---|---|---|
| | | | | RIGHT ||| SAME ||| LEFT |||
| | | | | V2→V3 ||| V2→V3 ||| V2→V3 |||
| | | | | RIGHT | SAME | LEFT | RIGHT | SAME | LEFT | RIGHT | SAME | LEFT |
| Vn1↓V0 | RIGHT | V2↓Vn1 | RIGHT | ○ | ○ | ○ | ○ | ○ | ○ | — | — | — |
| | | | SAME | ○ | ○ | ○ | ○ | ○ | ○ | — | — | — |
| | | | LEFT | ○ | ○ | ○ | ○ | ○ | ○ | — | — | — |
| | SAME | V2↓Vn1 | RIGHT | ○ | ○ | ○ | ○ | — | — | — | — | — |
| | | | SAME | ○ | ○ | ○ | — | — | — | — | — | — |
| | | | LEFT | ○ | ○ | ○ | — | — | — | — | — | — |
| | LEFT | V2↓Vn1 | RIGHT | — | — | — | — | — | — | — | — | — |
| | | | SAME | — | — | — | — | — | — | — | — | — |
| | | | LEFT | — | — | — | — | — | — | — | — | — |

FIG. 20

⟨TABLE 8⟩

| | | | V1→V2 | | | | | |
|---|---|---|---|---|---|---|---|---|
| | | | RIGHT | | | SAME | | |
| | | | V2→V3 | | | V2→V3 | | |
| | | | RIGHT | SAME | LEFT | RIGHT | SAME | LEFT |
| Vn1↓V0 | RIGHT | V2↓Vn1 RIGHT | →<br>↑↓v0<br>→<br>← | →<br>↑↓v0<br>→<br>↓ | →<br>↑↓v0<br>→<br>↓→ | →<br>↑↓v0<br>→→<br>↓ | →<br>↑↓v0<br>→→→ | →<br>↑↓v0 ↑<br>→→ |
| | | SAME | →→<br>↓v0<br>→<br>← | →→<br>↓v0<br>→<br>↓ | →→<br>↓v0<br>→<br>↓→ | →→<br>↓v0<br>→→ | →→<br>↓v0<br>→→→ | →→<br>↓v0 ↑<br>→→ |
| | | LEFT | ↓<br>→<br>↓v0<br>→<br>← | ↓<br>→<br>↓v0<br>→<br>↓ | ↓<br>→<br>↓v0<br>→<br>↓→ | ↓<br>→<br>↓v0<br>→→ | ↓<br>→<br>↓v0<br>→→→ | ↓<br>→<br>↓v0 ↑<br>→→ |
| | SAME | V2↓Vn1 RIGHT | →<br>↓v0<br>→<br>← | →<br>↓v0<br>→<br>↓ | →<br>↓v0<br>→<br>↓→ | →<br>↓v0<br>→→ | — | — |
| | | SAME | ↓v0<br>→<br>← | ↓v0<br>→<br>↓ | ↓v0<br>→<br>↓→ | — | — | — |
| | | LEFT | ←<br>↓<br>↓v0<br>→<br>← | ←<br>↓<br>↓v0<br>→<br>↓ | ←<br>↓<br>↓v0<br>→<br>↓→ | — | — | — |

FIG. 21

| DIAGONALIZATION-DETERMING TABLE 132 | | | | | | | | | |
|---|---|---|---|---|---|---|---|---|---|
| | | w1 | | | | | | | |
| | | 8 | 7 | 6 | 5 | 4 | 3 | 2 | 1 | 0 |
| w2 | 8 | 1 | 1 | 1 | 1 | 1 | 1 | 0 | 0 | 0 |
| | 8 | 1 | 1 | 1 | 1 | 1 | 1 | 0 | 0 | 0 |
| | 6 | 1 | 1 | 1 | 1 | 1 | 1 | 0 | 0 | 0 |
| | 5 | 1 | 1 | 1 | 1 | 0 | 0 | 0 | 0 | 0 |
| | 4 | 1 | 1 | 1 | 0 | 0 | 0 | 0 | 0 | 0 |
| | 3 | 1 | 1 | 1 | 0 | 0 | 0 | 0 | 0 | 0 |
| | 2 | 0 | 0 | 0 | 0 | 0 | 0 | 0 | 0 | 0 |
| | 1 | 0 | 0 | 0 | 0 | 0 | 0 | 0 | 0 | 0 |
| | 0 | 0 | 0 | 0 | 0 | 0 | 0 | 0 | 0 | 0 |

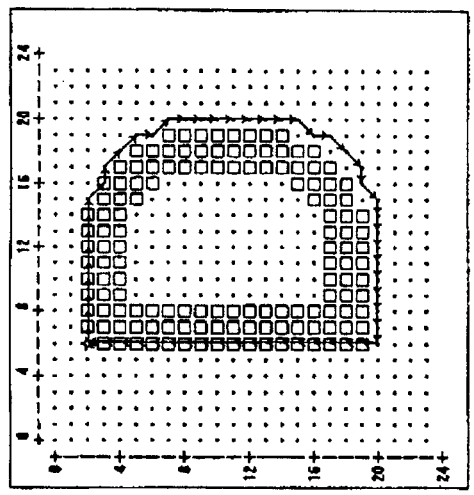
FIG. 22A
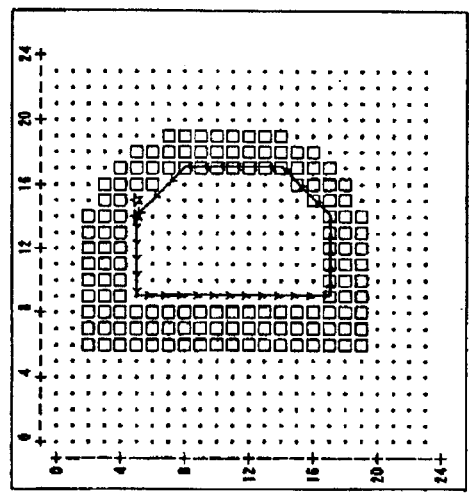
FIG. 22B

F I G. 2 3

⟨TABLE 9⟩

| VECTOR VALUE | → | ╲. | ↓ | ./ | ← | '╲ | ↑ | ╱' |
|---|---|---|---|---|---|---|---|---|
|  | 0 | 1 | 2 | 3 | 4 | 5 | 6 | 7 |
| AMOUNT OF SHIFT IN X DIRECTION | BX | BX | 0 | -BX | -BX | -BX | 0 | BX |
| AMOUNT OF SHIFT IN Y DIRECTION | 0 | BY | BY | BY | 0 | -BY | -BY | -BY |

FIG. 24

⟨TABLE 10⟩

| VECTOR VALUE | AMOUNT OF SHIFT FROM PRECEDING COORDINATE POINT | BASIC OUTLINE COORDINATES |
|---|---|---|
| ↑ VCT1B[0]=0 | (+BX, 0) | (14, 6) |
| ↑ VCT1B[1]=0 | (+BX, 0) | (16, 6) |
| ⋮ | ⋮ | ⋮ |
| ↑ VCT1B[9]=1 | (+BX, +BY) | (32, 9) |
| ↑ VCT1B[10]=0 | (+BX, 0) | (34, 9) |
| ↑ VCT1B[11]=1 | (+BX, +BY) | (36, 12) |
| ⋮ | ⋮ | ⋮ |
| ↑ VCT1B[54]=6 | (0, −BY) | (32, 9) |
| ↑ VCT1B[55]=6 | (0, −BY) | (12, 6) |

FIG. 25

⟨TABLE 11⟩

| COORDINATES OF STARTING POINT | | COORDINATES OF END POINT |
|---|---|---|
| (12, 6) | − | (14, 6) |
| (14, 6) | − | (16, 6) |
| | ⋮ | |
| (32, 9) | − | (34, 9) |
| (34, 9) | − | (36, 12) |
| | ⋮ | |
| (32, 9) | − | (12, 6) |

FIG. 26

⟨TABLE 12⟩

| CORRECTION DATA | DIRECTION OF CORRECTION |
|---|---|
| 0 | NO CORRECTION |
| 1 | SAME DIRECTION AS PRESENT VECTOR |
| 2 | 45° RIGHTWARD FROM PRESENT VECTOR |
| 3 | 90° RIGHTWARD FROM PRESENT VECTOR |
| 4 | 135° RIGHTWARD FROM PRESENT VECTOR |
| 5 | OPPOSITE DIRECTION |
| 6 | 135° LEFTWARD FROM PRESENT VECTOR |
| 7 | 90° LEFTWARD FROM PRESENT VECTOR |
| 8 | 45° LEFTWARD FROM PRESENT VECTOR |

F I G. 2 7

⟨TABLE 13⟩

| Hdr VALUE | 0 | 1 | 2 | 3 | 4 | 5 | 6 | 7 |
|---|---|---|---|---|---|---|---|---|
| AMOUNT OF SHIFT IN X DIRECTION | HX | HX | 0 | −HX | −HX | −HX | 0 | HX |
| AMOUNT OF SHIFT IN Y DIRECTION | 0 | HY | HY | HY | 0 | −HY | −HY | −HY |

F I G. 2 8

⟨TABLE 14⟩

| FACTOR (BX, BX) | NUMBER OF CORRECTION DOTS (HX, HY) |
|---|---|
| 1 | 0 |
| 2 | 0 |
| 3 | 1 |
| 4 | 2 |
| 5 | 2 |
| 6 | 3 |
| 7 | 3 |
| 8 | 4 |
| 9 | 4 |
| 10 | 5 |
| 11 | 10 |

FIG. 29

| No | Vn3 | Vn2 | Vn1 | V0 | V1 | V2 | H | Hdr | BASIC COORDINATES | CORRECTED COORDINATES | PROCESSING |
|---|---|---|---|---|---|---|---|---|---|---|---|
| 1 | 6 | 6 | 6 | 0 | 0 | 0 | 0 | - | (18, 8) | ← | CORRECTION OF STARTING POINT |
| 2 | 6 | 6 | 0 | 0 | 0 | 0 | 9 | - | (21, 8) | ← | LINE SKIP |
| 3 | 6 | 0 | 0 | 0 | 0 | 0 | 0 | - | (24, 8) | ← | LINE{(18,8)−(24,8)} |
| 4 | 0 | 0 | 0 | 0 | 0 | 0 | 0 | - | (27, 8) | ← | LINE{(24,8)−(27,8)} |
| 5 | 0 | 0 | 0 | 0 | 0 | 0 | 0 | - | (30, 8) | ← | LINE{(27,8)−(30,8)} |
| 6 | 0 | 0 | 0 | 0 | 0 | 0 | 0 | - | (33, 8) | ← | LINE{(30,8)−(33,8)} |
| 7 | 0 | 0 | 0 | 0 | 0 | 0 | 0 | - | (36, 8) | ← | LINE{(33,8)−(36,8)} |
| 8 | 0 | 0 | 0 | 0 | 0 | 1 | 9 | - | (39, 8) | ← | LINE SKIP |
| 9 | 0 | 0 | 0 | 0 | 1 | 0 | 9 | - | (42, 8) | ← | LINE SKIP |
| 10 | 0 | 0 | 0 | 1 | 0 | 1 | 2 | 2 | (45, 8) | (45, 10) | LINE{(36,8)−(45,10)} |
| 11 | 0 | 0 | 1 | 0 | 1 | 1 | 9 | - | (48, 12) | ← | LINE SKIP |
| 12 | 0 | 1 | 0 | 1 | 1 | 2 | 2 | 2 | (51, 12) | (51, 14) | LINE{(45,10)−(51,14)} |
| 13 | 1 | 0 | 1 | 1 | 2 | 1 | 9 | - | (54, 16) | ← | LINE SKIP |
| 14 | 0 | 1 | 1 | 2 | 1 | 2 | 3 | 4 | (57, 20) | (56, 20) | LINE{(51,14)−(56,20)} |
| 15 | 1 | 1 | 2 | 1 | 2 | 2 | 9 | - | (57, 24) | ← | LINE SKIP |
| 16 | 1 | 2 | 1 | 2 | 2 | 2 | 3 | 4 | (60, 28) | (59, 28) | LINE{(56,20)−(59,28)} |
| 17 | 2 | 1 | 2 | 2 | 2 | 2 | 9 | - | (60, 32) | ← | LINE SKIP |
| 18 | 1 | 2 | 2 | 2 | 2 | 2 | 9 | - | (60, 36) | ← | LINE SKIP |
| 19 | 2 | 2 | 2 | 2 | 2 | 2 | 0 | - | (60, 40) | ← | LINE{(59,28)−(60,40)} |
| 20 | 2 | 2 | 2 | 2 | 2 | 2 | 0 | - | (60, 44) | ← | LINE{(60,40)−(60,44)} |
| 21 | 2 | 2 | 2 | 2 | 2 | 2 | 0 | - | (60, 48) | ← | LINE{(60,44)−(60,48)} |
| 22 | 2 | 2 | 2 | 2 | 2 | 3 | 9 | - | (60, 52) | ← | LINE SKIP |
| 23 | 2 | 2 | 2 | 2 | 3 | 2 | 9 | - | (60, 56) | ← | LINE SKIP |
| 24 | 2 | 2 | 2 | 3 | 2 | 3 | 2 | 4 | (60, 60) | (59, 60) | LINE{(60,48)−(59,60)} |
| 25 | 2 | 2 | 3 | 2 | 3 | 3 | 9 | - | (57, 64) | ← | LINE SKIP |
| 26 | 2 | 3 | 2 | 3 | 3 | 4 | 2 | 4 | (57, 68) | (56, 68) | LINE{(59,60)−(56,68)} |
| 27 | 3 | 2 | 3 | 3 | 4 | 3 | 9 | - | (54, 72) | ← | LINE SKIP |
| 28 | 2 | 3 | 3 | 4 | 3 | 4 | 3 | 6 | (51, 76) | (51, 74) | LINE{(56,68)−(51,74)} |
| 29 | 3 | 3 | 4 | 3 | 4 | 4 | 9 | - | (48, 76) | ← | LINE SKIP |
| 30 | 3 | 4 | 3 | 4 | 4 | 4 | 3 | 6 | (45, 80) | (45, 78) | LINE{(51,74)−(45,78)} |
| 31 | 4 | 3 | 4 | 4 | 4 | 4 | 9 | - | (42, 80) | ← | LINE SKIP |
| 32 | 3 | 4 | 4 | 4 | 4 | 4 | 9 | - | (39, 80) | ← | LINE SKIP |
| 33 | 4 | 4 | 4 | 4 | 4 | 4 | 0 | - | (36, 80) | ← | LINE{(48,78)−(36,80)} |
| 34 | 4 | 4 | 4 | 4 | 4 | 4 | 0 | - | (33, 80) | ← | LINE{(36,80)−(33,80)} |
| 35 | 4 | 4 | 4 | 4 | 4 | 4 | 0 | - | (30, 80) | ← | LINE{(33,80)−(30,80)} |
| 36 | 4 | 4 | 4 | 4 | 4 | 4 | 0 | - | (27, 80) | ← | LINE{(30,80)−(27,80)} |
| 37 | 4 | 4 | 4 | 4 | 4 | 6 | 0 | - | (24, 80) | ← | LINE{(27,80)−(24,80)} |
| 38 | 4 | 4 | 4 | 4 | 6 | 6 | 9 | - | (21, 80) | ← | LINE SKIP |
| 39 | 4 | 4 | 4 | 6 | 6 | 6 | 0 | - | (18, 80) | ← | LINE{(24,80)−(18,80)} |
| 40 | 4 | 4 | 6 | 6 | 6 | 6 | 9 | - | (18, 76) | ← | LINE SKIP |
| 41 | 4 | 6 | 6 | 6 | 6 | 6 | 0 | - | (18, 72) | ← | LINE{(18,80)−(18,72)} |
| 42 | 6 | 6 | 6 | 6 | 6 | 6 | 0 | - | (18, 68) | ← | LINE{(18,72)−(18,68)} |
| 43 | 6 | 6 | 6 | 6 | 6 | 6 | 0 | - | (18, 64) | ← | LINE{(18,68)−(18,64)} |
| 44 | 6 | 6 | 6 | 6 | 6 | 6 | 0 | - | (18, 60) | ← | LINE{(18,64)−(18,60)} |
| 45 | 6 | 6 | 6 | 6 | 6 | 6 | 0 | - | (18, 56) | ← | LINE{(18,60)−(18,56)} |
| 46 | 6 | 6 | 6 | 6 | 6 | 6 | 0 | - | (18, 52) | ← | LINE{(18,56)−(18,52)} |
| 47 | 6 | 6 | 6 | 6 | 6 | 6 | 0 | - | (18, 48) | ← | LINE{(18,52)−(18,48)} |
| 48 | 6 | 6 | 6 | 6 | 6 | 6 | 0 | - | (18, 44) | ← | LINE{(18,48)−(18,44)} |
| 49 | 6 | 6 | 6 | 6 | 6 | 6 | 0 | - | (18, 40) | ← | LINE{(18,44)−(18,40)} |
| 50 | 6 | 6 | 6 | 6 | 6 | 6 | 0 | - | (18, 36) | ← | LINE{(18,40)−(18,36)} |
| 51 | 6 | 6 | 6 | 6 | 6 | 6 | 0 | - | (18, 32) | ← | LINE{(18,36)−(18,32)} |
| 52 | 6 | 6 | 6 | 6 | 6 | 6 | 0 | - | (18, 28) | ← | LINE{(18,32)−(18,28)} |
| 53 | 6 | 6 | 6 | 6 | 6 | 6 | 0 | - | (18, 24) | ← | LINE{(18,28)−(18,24)} |
| 54 | 6 | 6 | 6 | 6 | 6 | 6 | 0 | - | (18, 20) | ← | LINE{(18,24)−(18,20)} |
| 55 | 6 | 6 | 6 | 6 | 6 | 0 | 0 | - | (18, 16) | ← | LINE{(18,20)−(18,16)} |
| 56 | 6 | 6 | 6 | 6 | 0 | 0 | 9 | - | (18, 12) | ← | LINE{(18,16)−(18,12)} |
| 57 | 6 | 6 | 6 | 0 | 0 | 0 | - | - | (18, 8) | ← | RETURN TO STARTING POINT |
| 58 | | | | | | | | | | | STARTING POINT−END POINT DRAWING LINE {(18,12)−(18,8)} FOR STARTING POINT COORDINATES, USE VALUES CORRECTED BY NO. 1 PROCESSING |

FIG. 30

| No | Vn3 | Vn2 | Vn1 | V0 | V1 | V2 | H | Hdr | BASIC COORDINATES | CORRECTED COORDINATES | PROCESSING |
|---|---|---|---|---|---|---|---|---|---|---|---|
| 1 | 5 | 5 | 5 | 4 | 4 | 4 | 7 | 2 | ( 42, 20 ) | ( 42, 22 ) | CORRECTION OF STARTING POINT |
| 2 | 5 | 5 | 4 | 4 | 4 | 4 | 0 | – | ( 39, 20 ) | ← | LINE{(42,22)−(39,20)} |
| 3 | 5 | 4 | 4 | 4 | 4 | 4 | 9 | – | ( 36, 20 ) | ← | LINE SKIP |
| 4 | 4 | 4 | 4 | 4 | 4 | 2 | 0 | – | ( 33, 20 ) | ← | LINE{(39,20)−(33,20)} |
| 5 | 4 | 4 | 4 | 4 | 2 | 2 | 0 | – | ( 30, 20 ) | ← | LINE{(33,20)−(30,20)} |
| 6 | 4 | 4 | 4 | 2 | 2 | 2 | 0 | – | ( 27, 20 ) | ← | LINE{(30,20)−(27,20)} |
| 7 | 4 | 4 | 2 | 2 | 2 | 2 | 0 | – | ( 27, 24 ) | ← | LINE{(27,20)−(27,24)} |
| 8 | 4 | 2 | 2 | 2 | 2 | 2 | 0 | – | ( 27, 28 ) | ← | LINE{(27,24)−(27,28)} |
| 9 | 2 | 2 | 2 | 2 | 2 | 2 | 0 | – | ( 27, 32 ) | ← | LINE{(27,28)−(27,32)} |
| 10 | 2 | 2 | 2 | 2 | 2 | 2 | 0 | – | ( 27, 36 ) | ← | LINE{(27,32)−(27,36)} |
| 11 | 2 | 2 | 2 | 2 | 2 | 2 | 0 | – | ( 27, 40 ) | ← | LINE{(27,39)−(27,40)} |
| 12 | 2 | 2 | 2 | 2 | 2 | 2 | 0 | – | ( 27, 44 ) | ← | LINE{(27,40)−(27,44)} |
| 13 | 2 | 2 | 2 | 2 | 2 | 2 | 0 | – | ( 27, 48 ) | ← | LINE{(27,44)−(27,48)} |
| 14 | 2 | 2 | 2 | 2 | 2 | 2 | 0 | – | ( 27, 52 ) | ← | LINE{(27,48)−(27,52)} |
| 15 | 2 | 2 | 2 | 2 | 2 | 2 | 0 | – | ( 27, 56 ) | ← | LINE{(27,52)−(27,56)} |
| 16 | 2 | 2 | 2 | 2 | 2 | 0 | 0 | – | ( 27, 60 ) | ← | LINE{(27,56)−(27,60)} |
| 17 | 2 | 2 | 2 | 2 | 0 | 0 | 0 | – | ( 27, 64 ) | ← | LINE{(27,60)−(27,64)} |
| 18 | 2 | 2 | 2 | 0 | 0 | 0 | 0 | – | ( 27, 68 ) | ← | LINE{(27,64)−(27,68)} |
| 19 | 2 | 2 | 0 | 0 | 0 | 0 | 0 | – | ( 30, 68 ) | ← | LINE{(27,68)−(30,68)} |
| 20 | 2 | 0 | 0 | 0 | 0 | 0 | 0 | – | ( 33, 68 ) | ← | LINE{(30,68)−(33,68)} |
| 21 | 0 | 0 | 0 | 0 | 0 | 7 | 9 | – | ( 36, 68 ) | ← | LINE SKIP |
| 22 | 0 | 0 | 0 | 0 | 7 | 7 | 0 | – | ( 39, 68 ) | ← | LINE{(33,68)−(39,68)} |
| 23 | 0 | 0 | 0 | 7 | 7 | 7 | 8 | 6 | ( 42, 68 ) | ( 42, 66 ) | LINE{(39,68)−(42,66)} |
| 24 | 0 | 0 | 7 | 7 | 7 | 6 | 0 | – | ( 45, 64 ) | ← | LINE{(42,66)−(45,64)} |
| 25 | 0 | 7 | 7 | 7 | 6 | 6 | 0 | – | ( 48, 60 ) | ← | LINE{(45,64)−(48,60)} |
| 26 | 7 | 7 | 7 | 6 | 6 | 6 | 7 | 4 | ( 51, 56 ) | ( 50, 56 ) | LINE{(48,60)−(50,56)} |
| 27 | 7 | 7 | 6 | 6 | 6 | 6 | 0 | – | ( 51, 52 ) | ← | LINE{(50,56)−(51,52)} |
| 28 | 7 | 6 | 6 | 6 | 6 | 6 | 9 | – | ( 51, 48 ) | ← | LINE SKIP |
| 29 | 6 | 6 | 6 | 6 | 6 | 6 | 0 | – | ( 51, 44 ) | ← | LINE{(51,52)−(51,44)} |
| 30 | 6 | 6 | 6 | 6 | 6 | 5 | 9 | – | ( 51, 40 ) | ← | LINE SKIP |
| 31 | 6 | 6 | 6 | 6 | 5 | 5 | 0 | – | ( 51, 36 ) | ← | LINE{(51,44)−(51,36)} |
| 32 | 6 | 6 | 6 | 5 | 5 | 5 | 8 | 4 | ( 51, 32 ) | ( 50, 32 ) | LINE{(51,36)−(50,32)} |
| 33 | 6 | 6 | 5 | 5 | 5 | 4 | 0 | – | ( 48, 28 ) | ← | LINE{(50,32)−(48,28)} |
| 34 | 6 | 5 | 5 | 5 | 4 | 4 | 0 | – | ( 45, 24 ) | ← | LINE{(48,28)−(45,24)} |
| 35 | 5 | 5 | 5 | 4 | 4 | 4 | – | – | ( 42, 20 ) | ← | RETURN TO STARTING POINT |
| 36 | | | | | | | | | | | STARTING POINT−END POINT DRAWING LINE FOR STARTING POINT COORDINATES, USE VALUES CORRECTED BY NO. 1 PROCESSING |

⟨GRAPH 1⟩

FIG. 32

⟨LIST 1⟩

```
    dx = x2 - x1;              // ASSUMING x2 > x1
    dx = x2 - x1;              // ASSUMING dx >=dy
    l = 0;
    X = 0;

while( x <= x2 ){
        //round -> ROUNDING TO CLOSEST INTEGER
        y = round ( x1 + x * dy / dx );
        F[y][x+x1] = F[y][x+x1] | 0x01;  // AND
        x = x + 1;
    }
```

F I G. 3 3

⟨LIST 2⟩

```
    dx = x2 - x1;          // ASSUMING x2 > x1, dx >= dy if( y2 >= y1 ) {       // dy = abs(y2-y1)
        dy = y2 - y1;
        step = 1;
    }
    else{
        dy = y1 - y2;
        step = -1;
    } l = 0;    x = x1;    y = y1;

while ( x <= x2 ){
        if( l >= 1/2){
            l = l - 1;
            y = y + step;
        }
        F[y][x] = F[y][x] | 0x01;    // AND
        l = l + dy/dx;
        x = x + 1;
    }
```

F I G. 3 4

⟨LIST 3⟩

```
dx = x2 - x1;            // ASSUMING x2 > x1, dx >= dy if( y2 >= y1 ) {         // dy = abs(y2-y1)
    dy = y2 - y1;
    step = 1;
}
else{
    dy = y1 - y2;
    step = -1;
} l = dx;    x = x1;    y = y1;

while ( x <= x2 ){
    if( l >= ( 2 * dx )){
        l = l - 2 * dx;
        y = y + step;
    }
    F[y][x] = F[y][x] | 0x01;    // AND
    l = l + 2 * dy;
    x = x + 1;
}
```

F I G. 3 5

⟨LIST 4⟩

```
    dx = x2 - x1;           // ASSUMING x2 > x1, dx >= dy if( y2 >= y1 ) {        // dy = abs(y2-y1)
        dy = y2 - y1;
        step = 1;
    }
    else{
        dy = y1 - y2;
        step = -1;
    }

1 = 0;    x = x1;    y = y1;

while ( x <= x2 ){
        if( (2 * 1 ) >= dx ){
            1 = 1 - dx;
            y = y + 1;
        }
        F[y][x] = F[y][x] | 0x01;        // AND
        1 = 1 + dy;
        x = x + 1;
    }
```

FIG. 37

⟨LIST 5⟩

```
    dx = x2 - x1;          // ASSUMING x2 > x1, dx >= dy if( y2 >= y1 ) {       // dy = abs(y2-y1)
        dy = y2 - y1;
        step = 1;
    }
    else{
        dy = y1 - y2;
        step = -1;
    } l = 0;     x = x1;     y = y1;

while ( x <= x2 ){
        while( ( 2 * l ) >= dx ){
            l = l - dx;
            y = y + step;
        }
        F[y][x] = F[y][x] | 0x01;      // AND
        l = l + dy;
        x = x + 1;
    }
```

⟨GRAPH 3⟩

FIG. 40

⟨LIST 6⟩

```
    dy = y2 - y1;           // ASSUMING y2 > y1, dx >= dy if( x2 >= x1 ) {        // dx = abs(x2-x1)
        dx = x2 - x1;
        step = 1;
    }
    else{
        dx = x1 - x2;
        step = -1;
    }

1 = 0;    x = x1;    y = y1;

while ( y <= y2 ){
        if( ( 2 * 1 ) >= dy ){
            1 = 1 - dy;
            x = x + step;
        }
        F[y][x] = F[y][x] | 0x01;        // AND
        1 = 1 + dx;
        y = y + 1;
    }
```

F I G. 4 2

⟨LIST 7⟩

```
for( x = 0 ; x < XSIZE ; x++ ){
    for( y = 0 ; y < YSIZE-1 ; y++ ){
        F[y+1][x] = F[y+1][x]  F[y][x];        // XOR
    }
}
```

⟨GRAPH 7⟩

⟨GRAPH 9⟩

F I G. 4 7

⟨LIST 8⟩

```
dx = x2 - x1;           // ASSUMING x2 > x1, dx >= dy if( y2 >= y1 ) {        // dy = abs(y2-y1)
    dy = y2 - y1;
    step = 1;
}
else{
    dy = y1 - y2;
    step = -1;
}

1 = 0;    x = x1;    y = y1;

while ( x <= x2 ){      // END POINT IS NOT PROCESSED
    while( ( 2 * 1 ) >= dx ){
        1 = 1 - dx;
        y = y + step;
    }
    F[y][x] = F[y][x] | 0x01;    // XOR
    1 = 1 + dy;
    x = x + 1;
}
```

⟨GRAPH 10⟩

FIG. 49

⟨LIST 9⟩

```
for( x = 0 ; x < XSIZE ; x++ ){
    for( y = 0 ; y < YSIZE-1 ; y++ ){
        F[y+1][x] = F[y+1][x] ^ F[y][x];        // XOR
    }
}
```

FIG. 50
STROKE AREA
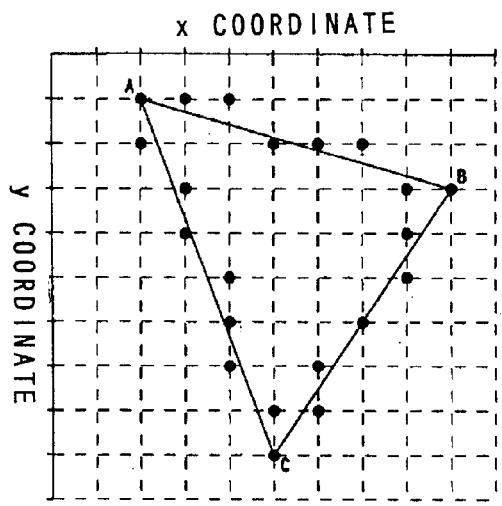
FILL AREA
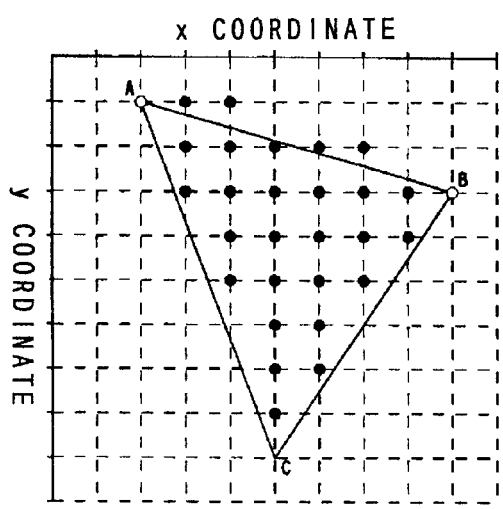
AND
↓
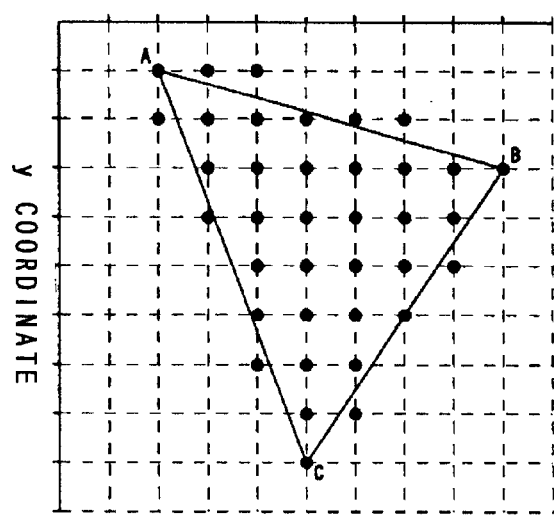

VECTOR DATA
{VCT1=[0,0,2,2,0,0,2,2,4,4,4,4,6,6,6,6]}

DRAW BY X-DIRECTION AND Y-DIRECTION ENLARGEMENT FACTORS OF TWO BY TWO

LINE{( 4, 4)−( 6, 4)}
LINE{( 6, 4)−( 8, 4)}
LINE{( 8, 4)−( 8, 6)}
LINE{( 8, 6)−( 8, 8)}
LINE{( 8, 8)−(10, 8)}
LINE{(10, 8)−(12, 8)}
LINE{(12, 8)−(12,10)}
LINE{(12,10)−(12,12)}
LINE{(12,12)−(10,12)}
LINE{(10,12)−( 8,12)}
LINE{( 8,12)−( 6,12)}
LINE{( 6,12)−( 4,12)}
LINE{( 4,12)−( 4,10)}
LINE{( 4,10)−( 4, 8)}
LINE{( 4, 8)−( 4, 6)}
LINE{( 4, 6)−( 4, 4)}

FIG. 53A $\overrightarrow{OP} = \mathbf{a}$ $\mathbf{a} = \uparrow a$

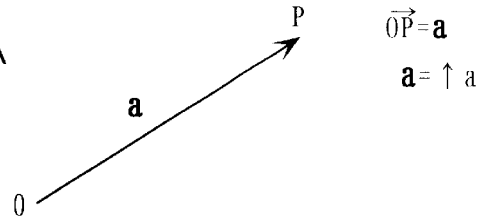

FIG. 53B

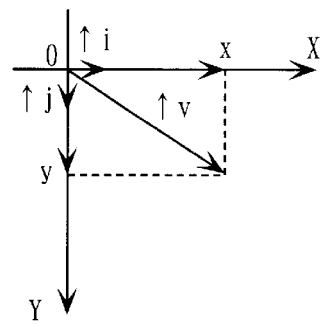

$\uparrow v = x \cdot \uparrow i + y \cdot \uparrow y$ $= \begin{pmatrix} x \\ y \end{pmatrix} \begin{pmatrix} \uparrow i & \uparrow j \end{pmatrix}$ $\uparrow v = \begin{pmatrix} x \\ y \end{pmatrix}$

FIG. 53C

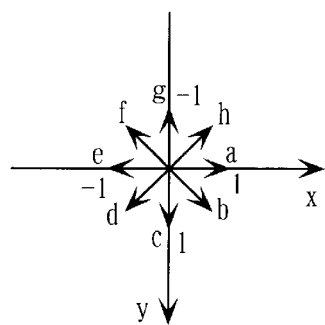

$\uparrow a = \begin{pmatrix} 1 \\ 0 \end{pmatrix}, \uparrow b = \begin{pmatrix} 1 \\ 1 \end{pmatrix}, \uparrow c = \begin{pmatrix} 0 \\ 1 \end{pmatrix}, \uparrow d = \begin{pmatrix} -1 \\ 1 \end{pmatrix}$ $\uparrow e = \begin{pmatrix} -1 \\ 0 \end{pmatrix}, \uparrow f = \begin{pmatrix} -1 \\ -1 \end{pmatrix}, \uparrow g = \begin{pmatrix} 0 \\ -1 \end{pmatrix}, \uparrow h = \begin{pmatrix} 1 \\ -1 \end{pmatrix}$ $\uparrow vct = \left\{ \begin{pmatrix} 1 \\ 0 \end{pmatrix}, \begin{pmatrix} 1 \\ 1 \end{pmatrix}, \begin{pmatrix} 0 \\ 1 \end{pmatrix} \cdots \begin{pmatrix} 1 \\ -1 \end{pmatrix} \right\}$ $= \left\{ \uparrow a, \uparrow b, \uparrow c \cdots \uparrow h \right\}$

OUTLINE SMOOTHING METHOD AND SYSTEM

BACKGROUND OF THE INVENTION

1. Field of the Invention

This invention relates to an outline smoothing method and system suitable for use in a character-outputting device which has bitmapped fonts, such as a printing device and a display device of a tape printing apparatus, a word processor, or a personal computer.

2. Prior Art

Conventionally, characters of various sizes have been printed or displayed by one of the following methods (1) to (3):

(1) a method of storing data of all character fonts to be printed or displayed;

(2) a method of storing and scaling (enlarging/reducing) bitmapped fonts; and (3) a method of storing and scaling (enlarging/reducing) outline fonts.

However, the method (1) requires a huge amount of data, and hence it is not practical.

As far as the method (2) is concerned, the print quality obtained by this method is inferior to that obtained by the method (1), and the attempt to solve the problem burdens a processor with increased software-based processing, which takes much time.

More specifically, to improve print quality, a printing device using a bitmap font carries out smoothing of "stairsteps" of the outline of an enlarged character image. A "stairstep" here means a portion of the outline of a character image, which appears stepped due to lack of bit map data for a diagonally adjacent portion between diagonally arranged dots, and develops a break or corrupted portion with enlargement of the character image.

For smooth outlines of character images, it has been conventionally carried out to detect such "stairsteps", and when the character images are enlarged, correction dots are added to infill the "stairsteps".

However, in the smoothing processing, if correction dots are increased in number, the contour of a character looses its shape to spoil the design of the character, whereas if the number of correction dots is reduced, jaggies remain noticeable on the outline of the character, so that as the scaling factor is larger, the correction of the image becomes less effective.

The method (3) requires a larger system size and a larger amount of data than the method (2), so that in a printing apparatus of a relatively small size, such as a tape printing apparatus, this method can be employed at the cost of either an increased processing time or an increased market price.

SUMMARY OF THE INVENTION

It is an object of the invention to provide an outline smoothing method, system and storage medium that enables a character image of a bitmapped font having an outline which looks smooth even when the character image is enlarged by a large scaling factor.

To attain the above object, according to a first aspect of the present invention, there is provided a method of smoothing an outline of a character image of a bitmapped font defined by bitmap data in a dot matrix format, the method comprising the steps of:

converting the bitmap data temporarily to vector data when the character image is expanded;

drawing lines on a new bitmap based on a sequence of a predetermined number of vectors, the sequence being shifted, one vector by one vector, from a start of the vector data to an end of the vector data, to thereby form an outline of the enlarged character image; and filling an inside of the outline with dots to thereby produce new bitmap data representative of the enlarged character image.

Preferably, the step of drawing lines includes the steps of:

determining basic outline coordinate points, based on the vector data;

correcting the basic outline coordinate points with reference to correction data defined in advance in a manner corresponding to respective patterns of variation in the sequence of the predetermined number of vectors, to thereby form corrected outline coordinate points; and connecting between each pair of adjacent ones of the corrected outline coordinate points by a line.

To attain the above object, according to a second aspect of the invention, there is provided a method of smoothing an outline of a character image of a bitmapped font defined by bitmap data in a dot matrix format, the method comprising the steps of:

determining coordinates of a starting point of the bitmap data, according to predetermined conditions, the starting point being associated with a start of vector data into which the bitmap data is converted, while referring to vectorized dot information indicative of whether or not each dot of the bitmap data has been vectorized;

converting the bitmap data to an orthogonal vector sequence by sequentially determining a direction of each adjacent dot of the bitmap data which is located next to a corresponding preceding dot, starting from the starting point, according to a predetermined order, and converting the each adjacent dot of the bitmap data into a vector of a direction of any of upward, downward, leftward, and rightward directions, with reference to the determined direction, while at the same time updating the vectorized dot information;

converting the orthogonal vector sequence to a diagonal vector sequence based on each sequence of a predetermined number of vectors of the orthogonal vector sequence, with reference to a diagonalization table defining in advance predetermined patterns of the each of sequence which is to be applied for converting a vector of the diagonal vector sequence to a diagonal vector;

carrying out line-drawing processing by producing bitmap coordinate points based on the starting point and the diagonal vector sequence and correcting the bit map coordinate points with reference to a correction data table defining in advance amounts of correction in units of dots in a manner associated with respective patterns of each sequence of a predetermined number of vectors of the diagonal vector sequence;

causing aforementioned steps to be repeatedly carried out until the step of determining the coordinates of a starting point can determine no more starting point, to thereby produce line data representative of results of the line-drawing processing; and producing new bitmap data based on the line data.

Preferably, the step of carrying out line-drawing processing includes producing data defining an outline of the character image and data defining a line for filling an inside thereof with dots by filling processing, and the step of producing new bit map data comprises the steps of:

carrying out the filling processing;

superposing data obtained by the filling processing and the data defining the outline one upon another; and carrying out stroke width-reducing processing for reducing a stroke width of the character image increased due to the vectorization.

Preferably, the step of determining coordinates of the starting point includes scanning dots of the bitmap data sequentially in a predetermined direction, and determining, as the coordinates of the starting point, coordinates of a dot which is not indicated to be vectorized by the vectorized dot information, and at the same time, shows a change from its immediately preceding dot.

Preferably, the step of converting the bitmap data to an orthogonal vector sequence comprises the steps of:

setting a vector value corresponding to the starting point and updating the vectorized dot information such that the starting point is vectorized;

shifting a dot position for vectorization to a next dot in a vector direction;

checking dots around the next dot to thereby determine a vector value of the next dot;

updating the vectorized information such that a dot corresponding to the shifted dot position is vectorized if the dot corresponding to the shifted dot position can be a candidate for the starting point; and repeatedly executing the aforementioned step of shifting the dot position to the aforementioned step of updating the vectorized dot information until the dot position for vectorization returns to the starting point.

Preferably, the step of carrying out line-drawing processing includes the steps of:

determining a starting coordinate point of a basic outline before correction, based on the starting point, according to predetermined conditions, and then determining each following coordinate point by adding, to a corresponding immediately preceding coordinate point, a shift amount determined based on a value of a vector of the diagonal vector sequence corresponding to the corresponding immediately preceding coordinate point, to thereby set basic outline coordinate points; and correcting the basic outline coordinate points with reference to the correction data table to thereby generate outline coordinate points.

More preferably, the step of carrying out line-drawing processing further includes the steps of:

producing data defining an outline of the character image by connecting between each successive two of the outline coordinate points by setting dots to a starting point, an ending point, and interpolation points at respective coordinate points which are closest to a straight line between the each successive two of the outline coordinate points and whose coordinates are integers, with one of two orthogonal coordinate axes of a coordinate system of the outline coordinate points being set to a reference axis, the one of the two orthogonal coordinate axes being an axis along which the straight line indicates a larger change in coordinate values than along another of the two orthogonal coordinate axes in dependence on a slope of the straight line; and producing data defining a line for filling an inside thereof with dots by connecting between the each successive two of the outline coordinate points by setting dots to the starting point and the interpolation points, with only a predetermined one of the two orthogonal coordinate axes of the coordinate system being set to a reference axis.

More preferably, the step of superposing data obtained by the filling processing and the data defining the outline one upon another includes performing a logical OR operation of the data obtained by the filling processing and the data defining the outline.

More preferably, the step of carrying out stroke width-reducing processing comprises the step of scanning coordinate points of superposed bitmap data obtained by the superposition of the data obtained by the filling processing and the data defining the outline in a vertical direction to make a present dot white when the present dot is black and at the same time an immediately following dot is white, and scanning the coordinate points of the superposed bitmap data in a horizontal direction to make a present dot white when the present dot is black and at the same time an immediately following dot is white, thereby deleting dots corresponding to a one-doth width in each of the vertical direction and the horizontal direction from the superposed bitmap data representative of the character image having vertical and horizontal widths thereof increased by one dot due to the vectorization.

To attain the above object, according to a third aspect of the invention, there is provided an outline smoothing system comprising:

a storage device for storing bit map data in a dot matrix format defining a bitmapped font;

a font processing device for converting the bitmap data temporarily to vector data when a character image of the bitmapped font is expanded, drawing lines on a new bitmap based on a sequence of a predetermined number of vectors, the sequence being shifted, one vector by one vector, from a start of the vector data to an end of the vector data, to thereby form an outline of the enlarged character image, and filling an inside of the outline with dots to thereby produce new bitmap data representative of the enlarged character image; and a character output device for printing or displaying the new bit map data.

More preferably, the font processing device comprises:

a basic outline-calculating section for determining basic outline coordinate points, based on the vector data; and a line segment-generating section for correcting the basic outline coordinate points with reference to a correction table defining correction data defined in advance in a manner corresponding to respective patterns of variation in the sequence of the predetermined number of vectors, to thereby form corrected outline coordinate points, and connecting between each pair of adjacent ones of the corrected outline coordinate points by a line.

To attain the above object, according to a fourth aspect of the invention, there is provided an outline smoothing system for a character output apparatus that prints or displays based on bitmap data, comprising:

a storage device for storing bit map data in a dot matrix format defining a bitmapped font;

a starting point-determining section for determining coordinates of a starting point of the bitmap data, according to predetermined conditions, the starting point being associated with a start of vector data into which the bitmap data is converted, while referring to vectorized dot information indicative of whether or not each dot of the bitmap data has been vectorized;

an orthogonal vector sequence-extracting section for converting the bitmap data to an orthogonal vector sequence by sequentially determining a direction of each adjacent dot of the bitmap data which is located next to a corresponding preceding dot, starting from the starting point, according to a predetermined order, and converting the each adjacent dot of the bitmap data into a vector of a direction of any of upward, downward, leftward, and rightward directions, with reference to the determined direction, while at the same time updating the vectorized dot information;

a diagonal-vectorization section for converting the orthogonal vector sequence to a diagonal vector sequence based on each sequence of a predetermined number of vectors of the orthogonal vector sequence, with reference to a diagonalization table defining in advance predetermined patterns of the each of sequence which is to be applied for converting a vector of the diagonal vector sequence to a diagonal vector;

a line-drawing section for carrying out line-drawing processing by producing bitmap coordinate points based on the starting point and the diagonal vector sequence and correcting the bit map coordinate points with reference to a correction data table defining in advance amounts of correction in units of dots in a manner associated with respective patterns of each sequence of a predetermined number of vectors of the diagonal vector sequence; and a bitmap data-producing section for producing new bitmap data based on line data representative of results of the line-drawing processing, the line data being formed by execution of processing of aforementioned sections until the starting point-determining section can determine no more starting point.

Preferably, the line-drawing sections includes an outline data-producing section for producing data defining an outline of the character image, and a filling line data-producing section for producing data defining a line for filling an inside thereof with dots by filling processing, and wherein the bitmap data-producing section includes a filling section for carrying out the filling processing, a superposing section for superposing data obtained by the filling processing and the data defining the outline one upon another, and a stroke width-correcting section carrying out stroke width-reducing processing for reducing a stroke width of the character image increased due to the vectorization.

Preferably, the correction data table comprises a plurality of tables of correction data prepared in advance respectively for a plurality of bitmapped fonts, for being selectively dependent on a selected one of the plurality of bitmapped fonts.

To attain the above object, according to a fifth aspect of the invention, there is provided a storage medium storing a program that can be executed by a computer, the program being capable of realizing a method of smoothing an outline of a character image of a bitmapped font defined by bitmap data in a dot matrix format, the program comprising:

a vector data-producing module for converting the bitmap data temporarily to vector data when the character image is expanded;

an outline-forming module for drawing lines on a new bitmap based on a sequence of a predetermined number of vectors, the sequence being shifted, one vector by one vector, from a start of the vector data to an end of the vector data, to thereby form an outline of the enlarged character image; and a new bitmap data-producing module for filling an inside of the outline with dots to thereby produce new bitmap data representative of the enlarged character image.

To attain the above object, according to a six aspect of the invention there is provided a storage medium storing a program that can be executed by a computer, the program being capable of realizing a method of smoothing an outline of a character image of a bitmapped font defined by bitmap data in a dot matrix format, the program comprising:

a starting point-determining module for determining coordinates of a starting point of the bitmap data, according to predetermined conditions, the starting point being associated with a start of vector data into which the bitmap data is converted, while referring to vectorized dot information indicative of whether or not each dot of the bitmap data has been vectorized;

an orthogonal vector sequence-extracting module for converting the bitmap data to an orthogonal vector sequence by sequentially determining a direction of each adjacent dot of the bitmap data which is located next to a corresponding preceding dot, starting from the starting point, according to a predetermined order, and converting the each adjacent dot of the bitmap data into a vector of a direction of any of upward, downward, leftward, and rightward directions, with reference to the determined direction, while at the same time updating the vectorized dot information;

a diagonal-vectorization module for converting the orthogonal vector sequence to a diagonal vector sequence based on each sequence of a predetermined number of vectors of the orthogonal vector sequence, with reference to a diagonalization table defining in advance predetermined patterns of the each of sequence which is to be applied for converting a vector of the diagonal vector sequence to a diagonal vector;

a line-drawing module for carrying out line-drawing processing by producing bitmap coordinate points based on the starting point and the diagonal vector sequence and correcting the bit map coordinate points with reference to a correction data table defining in advance amounts of correction in units of dots in a manner associated with respective patterns of each sequence of a predetermined number of vectors of the diagonal vector sequence;

a line data-producing module for causing aforementioned steps to be repeatedly carried out until the step of determining the coordinates of a starting point can determine no more starting point, to thereby produce line data representative of results of the line-drawing processing; and a bitmap data-producing module for producing new bitmap data based on the line data.

According to the outline smoothing methods and systems and the storage mediums therefor, the bitmap data stored in a font memory is once converted to vector data, and smoothed by using the vector data. Therefore, even a character image of a bitmapped font is enlarged by a large scaling factor, bit map data which provides smooth outlines of character images can be formed. To this end, the bitmap is represented by vectors in e.g. eight directions (upward, downward, leftward, and rightward directions, and four diagonal directions), and based on a sequence of e.g. six vectors, an optimal vector direction is determined. Further, based on patterns of a sequence of six vectors, the outline of a character image which vectors cannot properly or suitably express is corrected in units of dots.

According to the present invention, it is not only possible to print high-quality character images even when they are enlarged, but also possible to effect data compression since the bitmap data is used. Depending on the size of characters, data compression algorithm based on arithmetic coding, it is possible to effect about 40% compression. Normally, even when apparatuses storing outline fonts, bitmap data is sometimes used to print a small character handled at a low resolution to avoid degradation of a print quality. According to the invention, irrespective of whether the size of characters is large or small, they can be printed with the same quality, and further the capacity of a memory can be saved.

Further, the invention can be applied not only to a printing device and a display device of word processors and personal computers (PCs), but also to apparatuses having a relatively small size, such as a tape printing apparatus, and thereby enable such apparatuses to form character images having smooth outlines by the outline smoothing when they are enlarged, without any cost of degraded print quality, slower processing speed, and price.

The above and other objects, features, and advantages of the invention will become more apparent from the following detailed description taken in conjunction with the accompanying drawings.

BRIEF DESCRIPTION OF THE DRAWINGS

FIG. 2 is a block diagram showing functions of a control block appearing in FIG. 1, as respective areas of a memory associated with the respective functions;

FIG. 3B1 is a diagram which is useful in explaining definitions of vectors used in the embodiment;

FIG. 3B2 shows the definitions of the vectors in the form of a table;

FIG. 5 is a flowchart showing a routine for carrying out a vector starting point retrieving/determining process in FIG. 4;

FIG. 12 shows the relationship between conditions for determining a vector starting point and corresponding vector values, in the form of a table (Table 1);

FIG. 13 shows the relationship between respective immediately preceding vectors and retrieval order, in the form of a table (Table 2);

FIG. 14 shows the relationship between each retrieval direction pattern, a condition for determining a retrieval direction, and a corresponding vector value, in the form of a table (Table 3);

FIG. 15 shows the relationship between each vector value and a corresponding dot position for vectorization, in the form of a table (Table 4);

FIGS. 16A and 16B show an example of orthogonal-vectorization as images of bitmaps;

FIG. 17 shows directions of change between respective two sequential vector elements of an orthogonal vector sequence, in the form of a table (Table 5);

FIG. 18 shows the relationship between two sequential orthogonal vectors and a diagonal vector obtained from diagonalization of the two sequential orthogonal vectors, in the form of a table (Table 6);

FIG. 19 shows conditions for vector conversion in the form of a table (Table 7);

FIG. 20 shows the conditions for vector conversion as vector patterns, in the form of a table (Table 8);

FIG. 21 is a diagram showing a diagonalization-determining table;

FIGS. 22A and 22B show an example of diagonal-vectorization as images of bitmaps;

FIG. 23 shows the relationship between each vector value and a shift amount between corresponding coordinate points, in the form of a table (Table 9);

FIG. 24 shows the relationship between each vector value and a shift amount from an immediately preceding coordinate point, and a corresponding basic outline coordinate point, in the form of a table (Table 10);

FIG. 25 shows two coordinate points for use in line drawing in the form of a table (Table 11);

FIG. 26 shows the relationship between each correction data item and a corresponding correcting direction, in the form of a table (Table 12);

FIG. 27 shows the relationship between each correcting direction and a shift amount between coordinate points, in the form of a table (Table 13);

FIG. 28 shows the relationship between each scaling factor and the number of correction dots, in the form of a table (Table 14);

FIG. 29 shows an example of dot corrections in the form of a table (Table 15);

FIG. 30 shows another example of dot corrections in the form of a table (Table 16);

FIG. 32 shows an interpolated dot group-calculating algorithm in the form of a list (List 1);

FIG. 33 shows another interpolated dot group-calculating algorithm in the form of a list (List 2);

FIG. 34 shows another interpolated dot group-calculating algorithm in the form of a list (List 3);

FIG. 35 shows another interpolated dot group-calculating algorithm in the form of a list (List 4);

FIG. 37 shows another interpolated dot group-calculating algorithm in the form of a list (List 5);

FIG. 40 shows another interpolated dot group-calculating algorithm in the form of a list (List 6);

FIG. 42 shows an algorithm for a stroke line-based filling processing in the form of a list (List 7);

FIG. 47 shows an algorithm for use in generating interpolated dot group for a fill line, in the form of a list (List 8);

FIG. 49 shows an algorithm for fill line-based filling processing, in the form of a list (List 8);

FIG. 50 is a conceptual representation of an operation of superimposition of a stroke area and a fill area in the form of graphs;

FIGS. 53A to 53C shows more detailed definitions of vectors employed in the embodiment.

DETAILED DESCRIPTION

The invention will now be described in detail with reference to the drawings showing an embodiment thereof.

Figure 1:
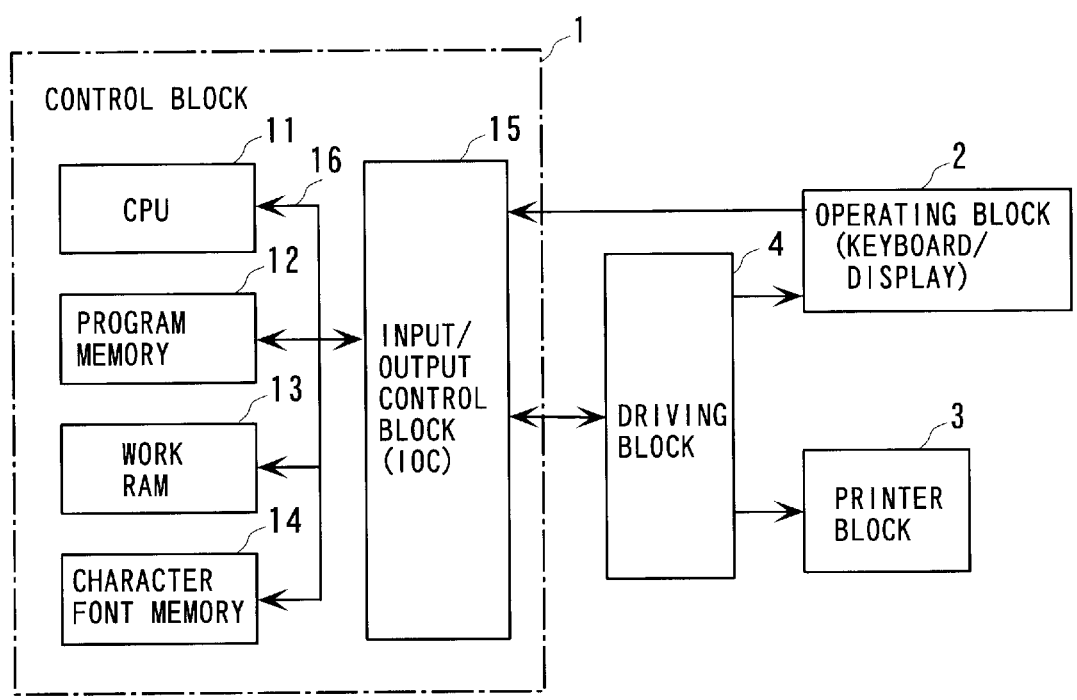
FIG. 1 is a block diagram showing the arrangement of a character-outputting apparatus to which is applied an outline-smoothing method and system according to an embodiment of the invention.

Referring first to FIG. 1, there is shown the arrangement of a character-outputting apparatus to which the present invention is applied. The embodiment of the invention will be described by taking a tape printing apparatus as an example of the character-outputting apparatus. The tape printing apparatus is capable of carrying out printing of a print image on a tape unwound from a tape cartridge, by a thermal printing method, and cutting off the printed portion of the tape to thereby produce a label. The print image is formed based on desired characters and the like entered via a keyboard of the apparatus.

As shown in FIG. 1, the tape printing apparatus is basically comprised of a control block 1 including a CPU 11 as a central component thereof, an operating block 2 having a keyboard and a display and interfacing with the user, and a printer block 3 having a print head of a thermal type for printing on a tape unwound from a tape cartridge. The operating block 2 and the printer block 3 are connected to the control block 1 via a driving block 4 having drivers for driving circuits of blocks and devices. The operating block 2, the printer block 3, and the driving block 4 are not directly related to the present invention, and hence further detailed description thereof is omitted.

The control block 1 is comprised of the CPU 11, a program memory 12, a work RAM (work memory) 13, a font memory 14, and an input/output control block 15, all of which are connected to each other via a bidirectional internal bus 16. The CPU 11 not only implements a main part of an outline smoothing system of the invention by using the work RAM 13, according to various programs described in detail hereinafter, stored in the program memory 12, but also controls the overall operation of the tape printing apparatus.

The work RAM 13 is used as a work area in which process data of an outline smoothing process is written as it is produced by a program therefor. The font memory 14 stores font data, i.e. data items each defining a character or the like, as bitmap data in the form of a dot matrix. When code data identifying a character or the like is input thereto, the font memory 14 outputs the corresponding font data item.

The input/output control block (IOC) 15 incorporates a logic circuit for complementing the functions of the CPU 11 as well as dealing with interface signals for interfacing between the CPU 11 and peripheral circuits. The logic circuit is implemented by gate arrays, custom LSIs, and the like. The IOC 15 receives commands and data entered e.g. via the keyboard, and inputs these to the internal bus 16 directly or after processing them. Further, the IOC 15 cooperates with the CPU 11 to deliver data and control signals input to the internal bus 16 via the CPU 11, to the driving block 4 directly or after processing them.

FIG. 2 shows the functions of the control block 1 appearing in FIG. 1, as an image of areas of a memory associated with the respective functions. The control block 1 implements the main part of the outline smoothing system, as described above. In the present embodiment, the control block 1 controls a sequence of operations for processing an image of each character by converting bitmap data corresponding to the character temporarily to data of vectors (vector data), drawing a line from a starting point of each vector to an ending point of the same of the vector data and carrying out dot correction, such that diagonal discontinuities between dots diagonally adjacent to each other on an original bitmapped image are covered by drawn lines, and then filling the inside of the lines, to thereby regenerate bitmap data corresponding to the character image for printing or display.

As shown in FIG. 2, the outline smoothing system (control block 1) according to the present invention is comprised of the font memory 14, a font-processing device (CPU 11), and a character-outputting block 20. The font-processing device 11 is comprised of sections performing respective functions, such as a starting point-retrieving/determining section 111, an orthogonal vector-extracting section 112, a diagonal-vectorization section 113, an line-drawing section 114, a filling section 115, and a stroke width-correcting section 116. The respective sections 111 to 116 are operated according to respective programs based on logics, described in detail hereinafter.

The starting point-retrieving/determining section 111 searches bitmap data stored in the font memory 14 to determine a coordinate point as a starting point of a sequence of vectors according to predetermined conditions, and supplies the coordinates of the starting point to the orthogonal vector-extracting section 112. The orthogonal vector-extracting section 112 checks a direction of change between each adjacent two of dots sequentially from the coordinates of the starting point supplied from the starting point-retrieving/determining section 111 and converts the change directions to an orthogonal vector sequence of four kinds of vectors, i.e. upward, downward, leftward, and rightward vectors. Further, the orthogonal vector-extracting section 112 updates vectorized dot information (flag memory 131) indicative of vectorization of the scanned dots.

The diagonal-vectorization section 113 converts the orthogonal vector sequence to a diagonal vector sequence based on a pattern of each sequence of six vectors (vector elements) of the orthogonal vector sequence obtained by the orthogonal vector-extracting section 112, with reference to a diagonalization-determining table 132 which defines in advance specific patterns for diagonalization, and then supplies the diagonal vector sequence to the line-drawing section 114.

The line-drawing section 114 corrects coordinate points for drawing lines on an enlarged bitmap coordinate system in units of dots, based a pattern of each sequence of six vectors of the diagonal vector sequence obtained by the diagonal-vectorization section 113, with reference to correction data defined in advance, and then draws a line between the corrected outline coordinate points. The line-drawing section 114 is comprised of a basic outline-calculating section for calculating basic outline coordinates on the bitmap data from the diagonal vector sequence obtained by the diagonal-vectorization section 113, a conversion table storing correction data defined in advance in a manner associated with patterns of a sequence of vector values, and a line segment-generating section which corrects the basic outline coordinate points with reference to the correction table and then draws a line between each adjacent two of the corrected outline coordinate points. As the outline coordinate points, there are produced two kinds of lines, i.e. ones representative of a stroke edge line and ones representative of a fill line.

The filling section 115 fills the inside of a fill line obtained by correcting the outline coordinate points as described above, and then carries out a logical OR operation of data stored in an outline-drawing area and data stored in a fill line-drawing area (both belonging to a bitmap area 134) of the work RAM 13, thereby superimposing the data.

The stroke width-correcting section 116 corrects the stroke width of a bitmap generated by the line-drawing section 114, which is increased by one dot as a result of the vectorization in respective X and Y directions defined hereinafter, by deleting one dot line from the stroke in each of the X and Y directions.

The character-outputting block 20 reads out a desired bitmap from the working bitmap area 134 for forming the bitmap into data of dots for printing, and then supplies the data to the printer block 3 for printing, via the IOC 15 and the driving block 4.

Details of logics based on which the above respective sections 111 to 116 operate will be described in detail hereinafter with reference to respective flowcharts.

Figure 3A:
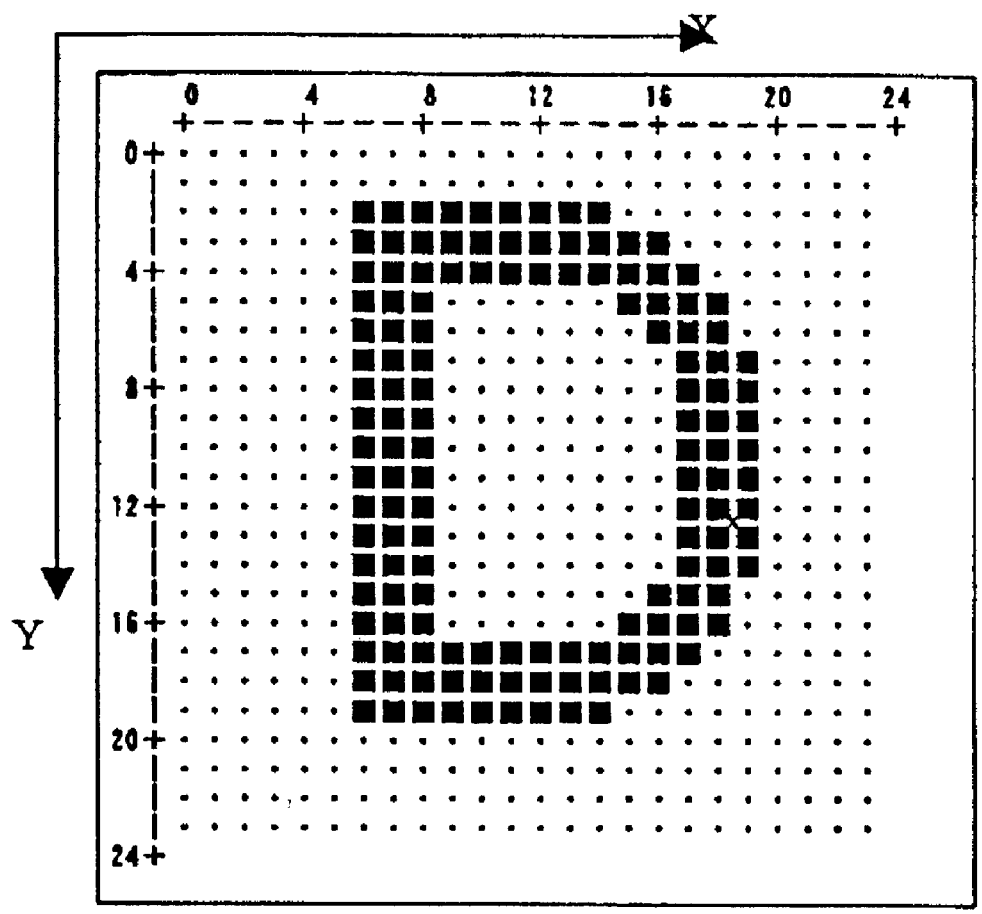
FIG. 3A is a diagram which is useful in explaining definitions of a coordinate system and a bitmap used in the embodiment.

Prior to describing the operation of the outline smoothing system according to the present invention, the definitions of coordinates and bitmap data described hereinbelow will be described below with reference to FIGS. 3A and 3B1, 3B2. FIG. 3A shows the definitions of coordinates and bitmap data, while FIGS. 3B1, 3B2 show the definitions of vectors.

Coordinates X and Y are defined as shown in FIG. 3A, and in the following, coordinate values are expressed as [X, Y]. Further, for convenience of description, a positive direction along the X axis is described as "rightward", and a negative direction along the same as "leftward", while a positive direction along the Y axis is described as "downward", and a negative direction along the same as "upward". In the bitmap data, a white dot is represented by 0 x 0 (hexadecimal notation of "0" in the C language), and a black one by 0 x 1 (hexadecimal notation of "1" in the C language). Further, coordinates (e.g. [0, −1]) outside the given bitmap data are regarded as a white dot (0 x 0).

The direction of each vector and a number assigned thereto are defined as shown in FIGS. 3B1 and 3B2. More specifically, the vectors are referred to by using the numbers 0 to 7 respectively assigned thereto and representative of eight directions i.e. rightward, diagonal rightward and downward, downward, diagonal leftward and downward, leftward, diagonal leftward and upward, upward, and diagonal rightward and upward directions. FIG. 3B2 shows symbols denoting the vectors having respective numbers. It should be noted that a single code cannot differentiate between vectors 1 and 5, or between vectors 3 and 7, and hence diagonal lines each marked with a comma (",") or a dot (".") as shown in FIG. 3B2 are used for differentiation between the vectors 1 and 5 and between the vectors 3 and 7.

FIGS. 53A to 53C show definitions of the vectors. In common practice, a vector "a" is expressed as a directed segment OP and denoted in bold type as shown in FIG. 53A. In the following description, however, the vector is represented as "↑a". Further, a vector ↑v in a X-Y coordinate system which can be expressed by using fundamental vectors ↑i, ↑j as ↑v=x·↑i+y·↑j as shown in FIG. 53B. However, it is simply expressed as ↑v in the following. Further, each direction vector is defined as shown in FIG. 53C and converted to a matrix. A set of the vectors is referred to as a vector space or vector group (vector sequence) and represented by ↑vct.

The rotational angle of each of these vectors (direction vectors) with respect to the X axis is expressed as follows:

∠(↑a)=0

∠(↑b)=π/4

∠(↑c)=π/2

∠(↑d)=3π/4

∠(↑e)=π

∠(↑f)=5π/4

∠(↑g)=3π/2

∠(↑h)=7π/4

The rotational angle between each two of the vectors can be obtained by subtraction between corresponding ones of the above values, such as:

∠(↑f-↑d)=∠(↑f)-∠(↑d)↑π/2

Now, for purposes of ease of calculation of a rotational angle or the like, the numbers 0 to 7 are assigned to the respective vectors as symbols each representative of a corresponding vector, as follows:

↑a→"0"

↑b→"1"

↑c→"2"

↑d→"3"

↑e→"4"

↑f→"5"

↑g→"6"

↑h→"7"

Therefore, the vector space or group ↑vct is expressed as follows:

↑vct={↑a, ↑b, ↑c, ↑d, ↑e, ↑f, ↑g, ↑h}={0, 1, 2, 3, 4, 5, 6, 7}

The n-th vector of the vector group ↑vct is represented by ↑vct[n]. For example, ↑vct[2]=↑c="2" holds.

Figure 4:
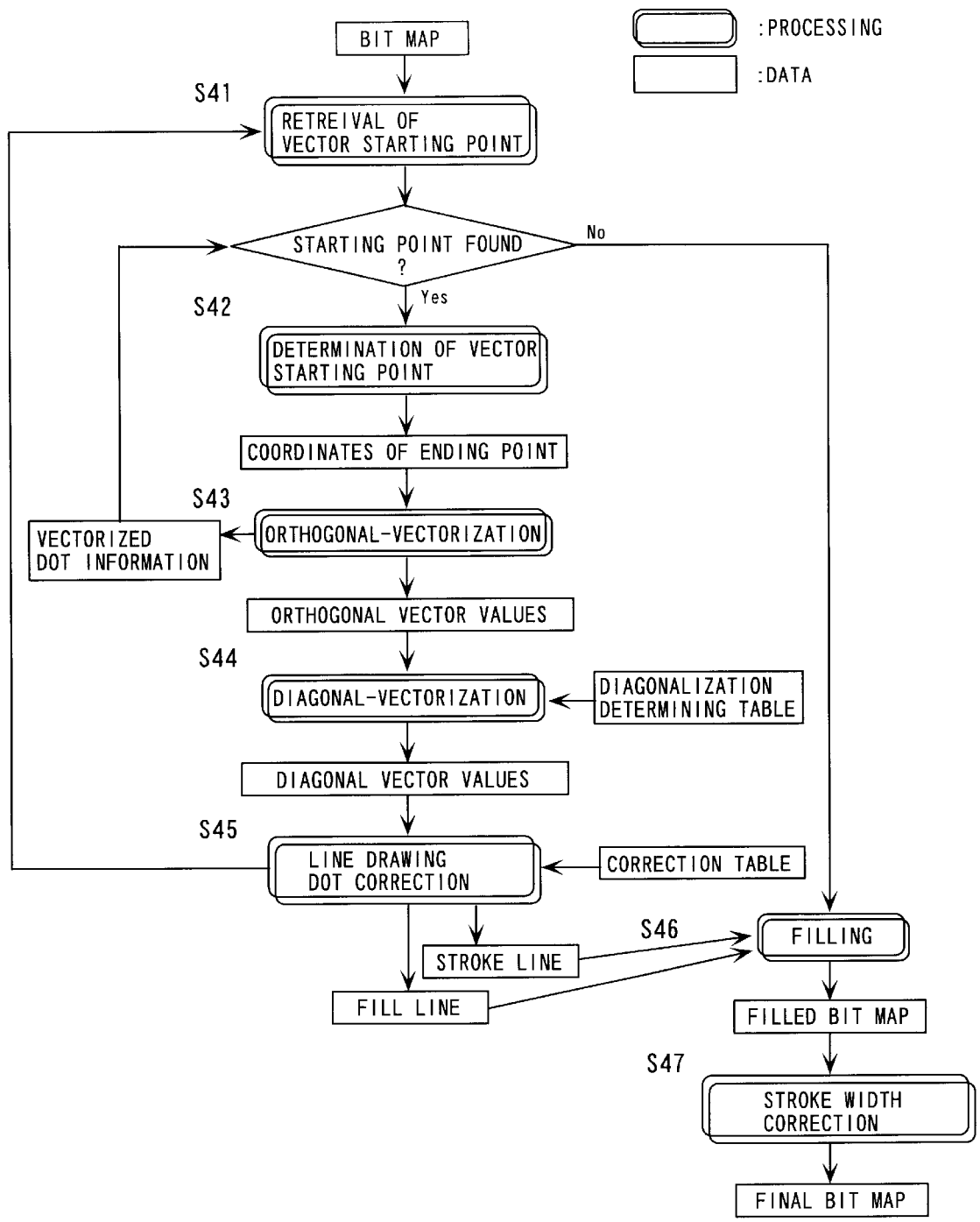
FIG. 4 is a flowchart showing an overall flow of processes to be executed by the control block for processing the bitmap.

FIG. 4 shows a flow of processing and data according to the embodiment of the invention. Now, the outline of a sequence of operations carried out by the respective sections 111 to 116 will be explained below.

First, the starting point-retrieving/determining section 111 searches bitmap data read out from the font memory 14 for coordinates of candidate vector starting points (S41). Further, the section 111 determines the coordinates of new vector starting points, based on the bitmap data and vectorized dot information, described in detail hereinafter, and delivers the result of the determination to the orthogonal vector-extracting section 112 whenever a new starting point is determined (S42).

The orthogonal vector-extracting section 112 scans the bitmap data from each starting point and converts the outline of the bitmap data to an orthogonal vector sequence of upward, downward, leftward, and rightward vectors to thereby extract orthogonal vectors covering the whole outline of the bitmap data starting from the starting point. Then, the section 112 delivers the extracted orthogonal vector sequence to the diagonal-vectorization section 113 (S43). The diagonal-vectorization section 113 converts the orthogonal vector sequence to a diagonal vector sequence based on patterns of each sequence of six vectors of the orthogonal vector sequence obtained by the orthogonal vector-extracting section 112, with reference to the diagonalization-determining table 132, referred to hereinafter, and then supplies the diagonal vector sequence to the line-drawing section 114 (S44). At this time point, the outline of a character is represented by the diagonal vector sequence comprised of eight kinds of direction vectors, i.e. four orthogonal vectors plus four diagonal vectors.

The line-drawing section 114 generates an outline while correcting coordinate points for the same. When drawing lines following vectors on an enlarged bitmap, the line-drawing section 114 corrects the coordinate points for use line drawing in units of dots based on a pattern of each sequence of six vectors of the diagonal vector sequence supplied from the diagonal-vectorization section 113, with reference to a correction table 133, referred to hereinafter (S45). Here, two kinds of lines, i.e. a stroke edge line and a line for filling processing are generated, and the line data is stored in the working bitmap area 134 until completion of processing for all possible starting points. As described above, the line-drawing section 114 draws a line while correcting an outline coordinate point, based on the corresponding diagonal vector sequence. Then, the program returns to the step S41, wherein another vector starting point is retrieved. The steps S41 to S45 are repeatedly executed as long as a new starting point can be found, and the processing of the data thus obtained is entrusted to the filling section 115.

The filling section 115 fills the inside of each line for filling processing which was generated by the line-drawing section 114, and then carries out superimposing of the filled area and the stroke edge lines (S46). The stroke width-correcting section 116 carries out processing for reducing the stroke width of the bitmap data having an increased overall stroke width due to the vectorization, by one dot line in each of the vertical and horizontal directions (S47).

In the following, details of the processes starting from the retrieval of a vector starting point (S41) to the stroke width correction (S47) will be described in detail with reference to detailed flowcharts shown in FIGS. 5 to 10.

First, description is made of the processing for retrieval/determination of a starting point which is executed by the starting point-retrieving/determining section 111 at the steps S41 and S42 in FIG. 4.

FIG. 5 shows a routine for retrieving/determining a starting point. In this routine, first, starting point retrieval is started from coordinates [0, 0] (S411). Then, the coordinate points in the coordinate system representative of the bitmap are scanned in the X direction so as to check on each dot whether or not it satisfies conditions for a starting point (S412).

A dot to be selected as a starting point is required to satisfy conditions that the dot (present dot) having coordinates [x, y] is a black one, and an immediately preceding dot having coordinates [x−1, y] is a white one, without no information of vectorization of the present dot being set to the vectorized dot information stored in the flag memory 131, i.e. on condition that the present dot has not been vectorized. It should be noted that the vectorized dot information is updated by the processing for extracting orthogonal vectors (S43), described in detail hereinafter, and that all values of the vectorized dot information have been initially cleared.

If a dot satisfying the conditions for being a starting point is found at the step S412, it is selected as a starting point, and the program proceeds to the orthogonal vector extraction. On the other hand, if no dots satisfy the conditions at the step, the coordinate value "y" is incremented by "1" (if the value "y" is at the extreme end of the Y axis, the coordinate value "x" is incremented by "1", and "y" is set to "0") at a step S413, followed by the steps S411 et seq. being repeatedly executed.

Figure 11A:
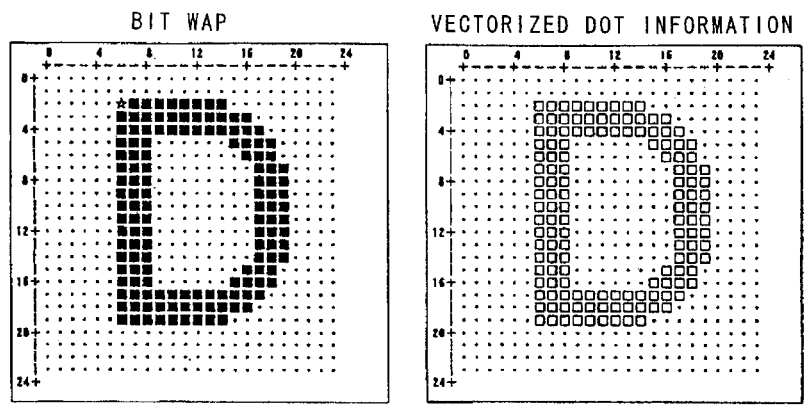
FIGS. 11A to 11C shows an example of starting point retrieval/determination as images of a bitmap.
Figure 11B:
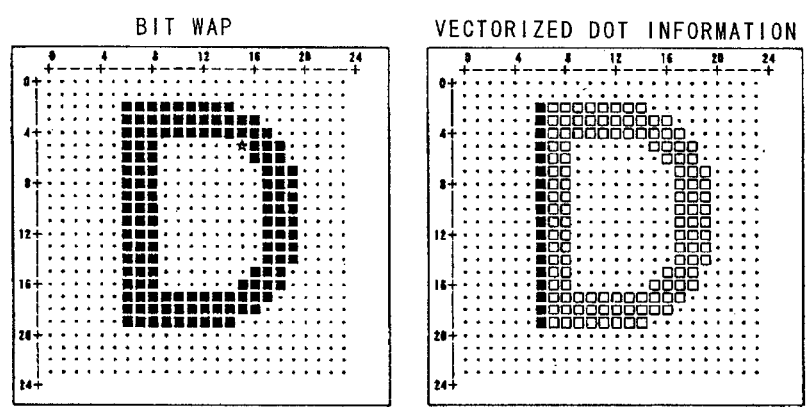
Figure 11C:
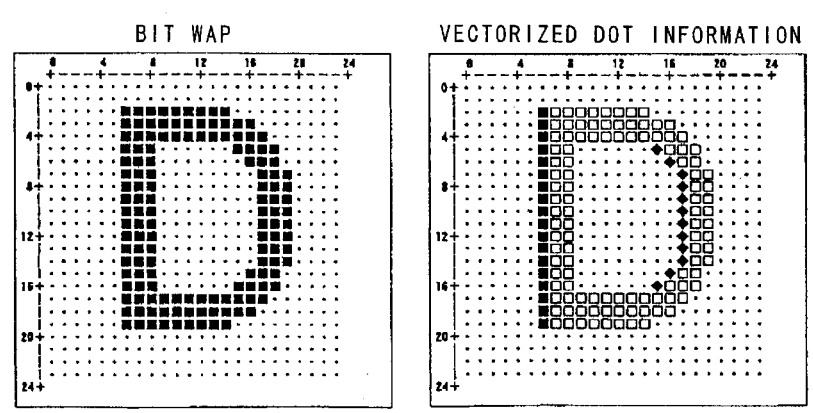

Now, an example of determination of a starting point will be described with reference to bitmaps shown in FIGS. 11A to 11C. FIGS. 11A to 11C show the bitmaps and the corresponding vectorized dot information in each of first to third retrievals of a starting point.

In the first retrieval, values of the vectorized dot information have been all cleared, so that a first black dot positioned immediately after a white one is not yet vectorized, and hence the dot of coordinates [6, 2] is selected as a starting point. In the second retrieval, since the dot of the coordinates [6, 2] was subjected to orthogonal-vectorization (see FIG. 16A), the vectorized dot information has been updated (see FIG. 16B). As a result, data of black dots, such as [6, 3], [6, 4], [6, 5], [6, 6], etc., each positioned immediately after a white dot is set in the vectorized dot information, and hence none of them can be selected as a starting point. Consequently, a dot of coordinates [15, 5] as a first dot satisfying the conditions is set to a starting point. In the first and second retrieval, black dots each positioned immediately after a white one are all subjected to orthogonal-vectorization, and data of the black dots is set in the flag memory 131 as vectorized dot information. Therefore, in the third retrieval, it is determined that there exists no starting point, followed by the program proceeding to a filling process (S46), described in detail hereinafter.

Figure 6:
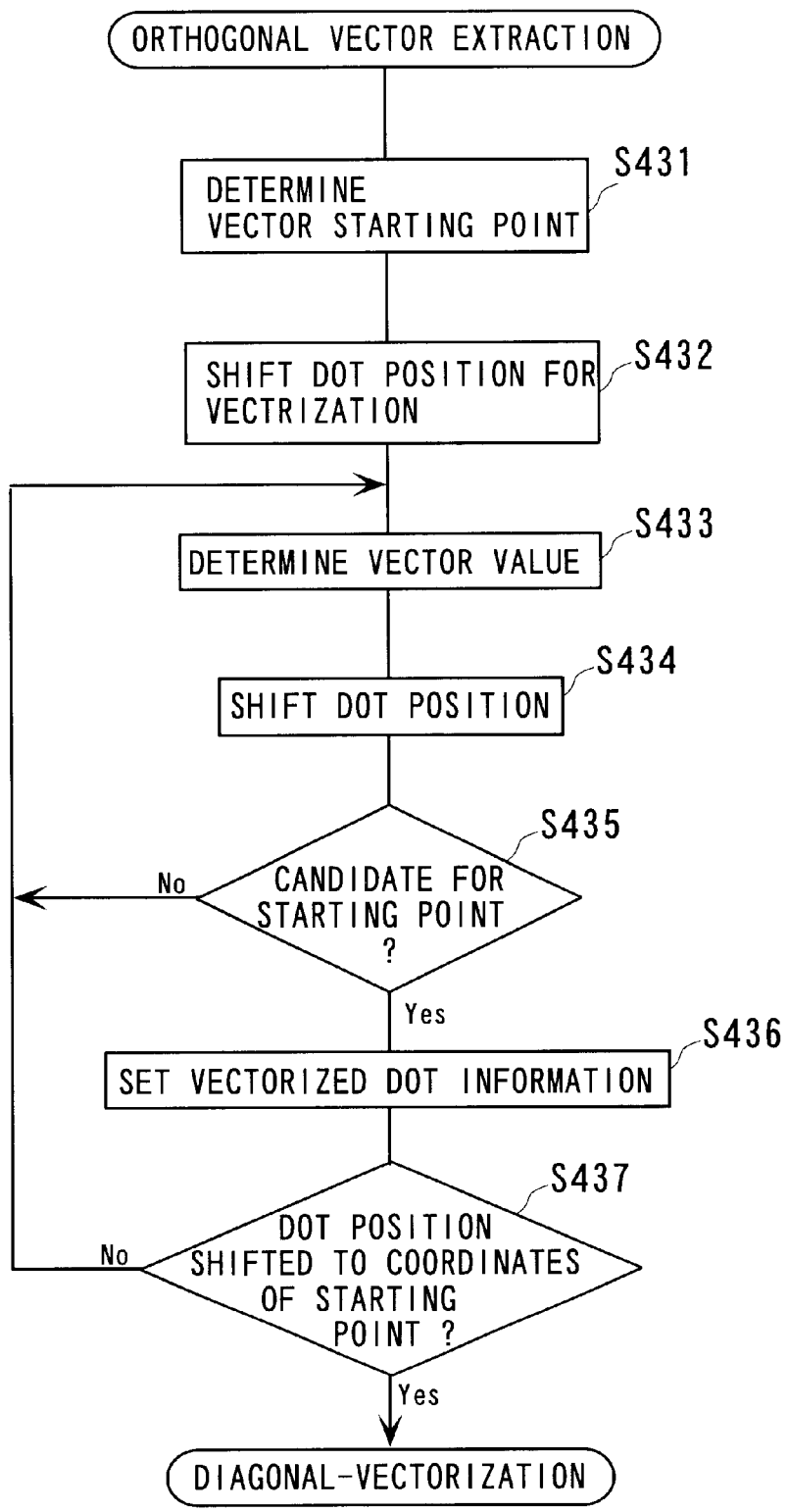
FIG. 6 is a flowchart showing a routine for carrying out an orthogonal-vectorization process in FIG. 4.

Next, the orthogonal-vectorization to be executed by the orthogonal vector-extracting section 112 at the step S42 in FIG. 4 will be described in detail with reference to FIG. 6 which shows a routine for carrying out the orthogonal-vectorization.

The process of the orthogonal-vectorization converts bitmap data to orthogonal vector values (i.e. four of the above-mentioned vector numbers each corresponding to one of the four kinds of vectors directed rightward (→), downward (↓), leftward (←), and upward (↑)). In this process, the bitmap data is scanned to check directions between each pair of respective two dots adjacent to each other sequentially from a starting point for vectorization. Vectorized data of the bitmap data is stored in the form of a vector sequence, such as TVCT =[0, 0, 2, 4, . . . ], without any information of positions of the respective dots.

First, as described below, a vector value of a starting point is determined and the vectorized dot information is set such that vectorized information is set to the dot of the starting point (S431). Then, the dot position for vectorization is shifted to an adjacent dot in the vector direction from the starting point (S432), and dots around the shifted dot position are checked to determine a vector value of the dot position (S433). Further, the dot position for vectorization is shifted to an adjacent dot in the vector direction (S434). If the dot to which the dot position for vectorization was shifted can be a starting point (S435), vectorized information is set to data of the dot to update the vectorized dot information (S436). If not, the steps S433 to S435 are repeatedly executed.

The vector value of a starting point is determined according to Table 1 shown in FIG. 12, and the dot position for vectorization is shifted from the starting point in the vector direction, to a shifted dot position for which a vector value is determined next. The vector value is determined by checking on conditions of vector patterns of the present dot according to a predetermined vector retrieval order determining priorities of vector patterns, in dependence on an immediately preceding vector value, and a value corresponding to a first satisfied one of the conditions is set to a vector value of the present dot. FIG. 13 shows the relationship between an immediately preceding vector and the retrieval order as Table 2, while FIG. 14 shows the relationship between each retrieval direction pattern, a condition for determining a retrieval direction, and a corresponding vector value, in the form of a table (Table 3).

It should be noted that each retrieval condition is not exclusive, but the condition for determining the vector "0" and that for determining the vector "4" are compatible, and so are the conditions for determining the respective vectors "2" and "6". Therefore, unless the processing is executed following the retrieval order, it is not possible to obtain a proper vector. The retrieval order in the present embodiment is determined such that priority is given to retrieving "a vector in a direction of counterclockwise rotation".

In this connection, assuming that the vector value of the present position is "6", i.e. if the vector is directed upward, a dot at the position shifted upward is a candidate starting point. Accordingly, it is required to exclude this dot from retrieval of a starting point, so that the "vectorized dot information" in the flag memory 131 is set to indicate the vectorized state of this dot. The shift of a dot in a vector direction is carried out following Table 4 shown in FIG. 15. In other words, the coordinate position of a dot for vectorization is shifted based on Table 4. Then, the steps S432 to S436 are repeatedly carried out until the dot position for vectorization is shifted to the starting point (S437).

Now, an example of orthogonal-vectorization will be described with reference to FIGS. 16A and 16B. The corresponding "vectorized dot information" in each of the figures is shown as an example of the starting point retrieval described above. FIG. 16A shows orthogonal vector data generated by the first starting point retrieval and vectorized dot information set at the time of completion of orthogonal-vectorization carried out after to the first starting point retrieval, while FIG. 16B shows orthogonal vector data generated by the second starting point retrieval and vectorized dot information set at the time of completion of orthogonal-vectorization carried out after the second starting point retrieval.

The coordinates of the starting point determined by the first retrieval are [6, 2], and the corresponding orthogonal vector data is expressed as ↑VCT=[0, 0, 0, 0, 0, 0, 0, 0, 0, 2, 0, 0, 2, 0, 2, 0, 2, 2, 0, 2, 2, 2, 2, 2, 2, 2, 4, 2, 2, 4, 2, 4, 2, 4, 4, 2, 4, 4, 4, 4, 4, 4, 4, 4, 6, 6, 6, 6, 6, 6, 6, 6, 6, 6, 6, 6, 6, 6, 6, 6, 6]. On the other hand, the coordinates of the starting point determined by the second retrieval are [15, 5], and the corresponding orthogonal vector data is expressed as ↑VCT=[4, 4, 4, 4, 4, 4, 2, 2, 2, 2, 2, 2, 2, 2, 2, 2, 2, 0, 0, 0, 0, 0, 6, 0, 6, 0, 6, 6, 6, 6, 6, 6, 6, 6, 4, 6, 4, 6].

Figure 7:
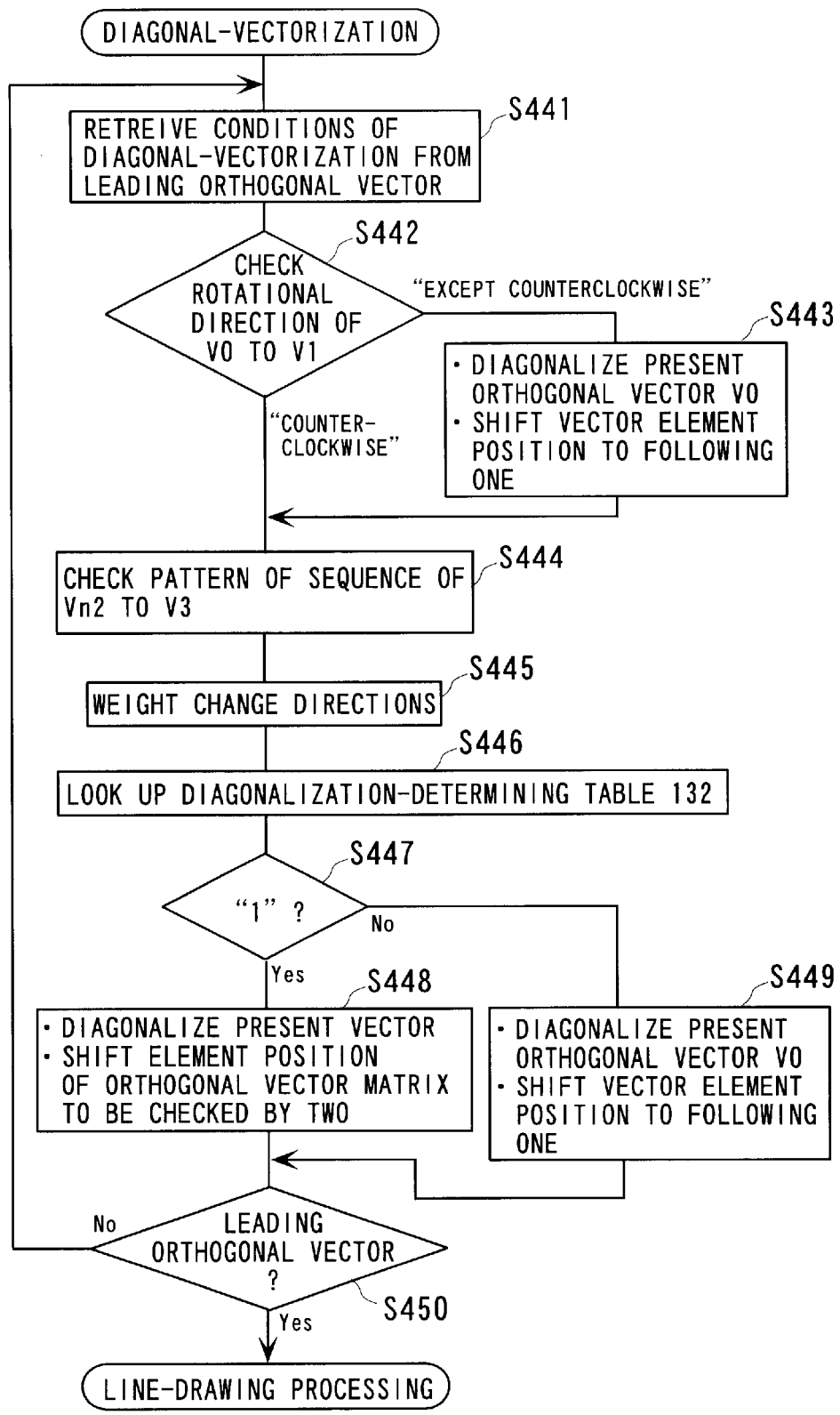
FIG. 7 is a flowchart showing a routine for carrying out a diagonal-vectorization process in FIG. 4.
Figure 8:
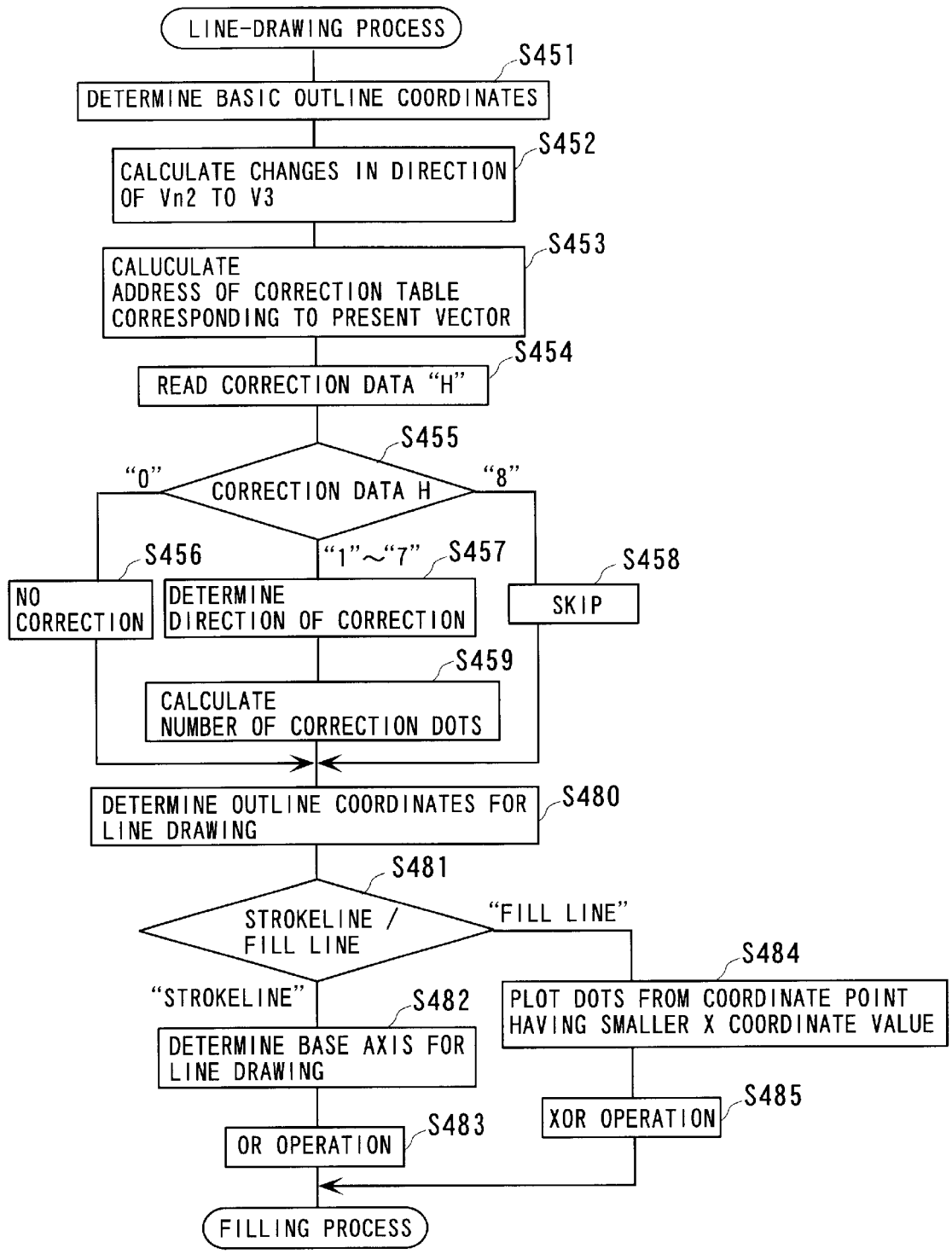
FIG. 8 is a flowchart showing a routine for carrying out a line-drawing process in FIG. 4.

Next, the diagonal-vectorization to be executed by the diagonal-vectorization section 113 will be described in detail with reference to a FIG. 7 flowchart showing a routine for executing diagonal-vectorization.

In this process, each vector change direction between two sequential vector elements, such as VCT[n−2] and VCT[n−1] or VCT[n] and VCT[n+1], of an orthogonal vector sequence ↑VCT={ . . . VCT[n−2], VCT[n−1], VCT[n], VCT[n+1], VCT[n+2] . . . } is defined as shown in a FIG. 17 table 5. If two sequential vector elements assume the same value, they are defined as directed in an identical direction.

Here, the last element of the vector sequence and the first element of the same are regarded as sequential vector elements. For instance, in a vector sequence ↑VCT={VCT[0], VCT[1], . . . VCT[n−2], VCT[n−1], VCT[n]}, the two elements VCT[0] and VCT[n] are sequential elements.

Further, in the orthogonal vector sequence ↑VCT={ . . . VCT[n−2], VCT[n−1], VCT[n], VCT[n+1], VCT[n+2], VCT[n+3] . . . }, the respective vector elements are defined as follows: VCT[n−2]=Vn2 (second preceding orthogonal vector); VCT[n−1]=Vn1 (immediately preceding orthogonal vector); VCT[n]=V0 (present orthogonal vector), VCT[n+1]=V1 (immediately following orthogonal vector); VCT[n+2]=V2 (second following orthogonal vector); VCT[n+3]=V3 (third following orthogonal vector), and so on.

The diagonal-vectorization section 113 is capable of converting two sequential orthogonal vectors to a diagonal vector (i.e. any one of a diagonal rightward and upward vector, a diagonal rightward and downward vector, a diagonal leftward and downward vector, and a diagonal leftward and upward vector) if the orthogonal vectors satisfy predetermined conditions described below. FIG. 18 shows patterns of conversion as Table 6. In this process, since two sequential orthogonal vectors are converted to one diagonal vector, vectors are reduced by a number corresponding to the number of times of the conversion.

The conversion is carried out as follows. First, the vector change direction between respective sequential two of the vector elements Vn2 to V3 are checked. If the change direction from V0 to V1 is counterclockwise, and if the change directions between the respective two vector elements satisfy conditions shown in FIG. 19 as Table 7, the vector elements V0 and V1 are converted to a diagonal vector. Table 8 in FIG. 20 shows the above conditions as vector patterns in the case of the vector V0 being directed downward (↓) It should be noted that in FIGS. 19 and 20, due to limited areas for entry of names of items, "rightward" and "leftward" are abbreviated to "right" and "left", respectively.

Now, a method of vector calculation for diagonal-vectorization will be described. The vector calculation is performed for determining conditions for diagonalization of an orthogonal vector sequence generated by the orthogonal vector-extracting section 112 and converting the orthogonal vector sequence to a new diagonal vector sequence. Diagonalized vectors do not affect conditions for a following diagonalization.

The flow of a process for the vector calculation will be described below with reference to the FIG. 7 flowchart. The vector calculation is started from the leading position of the orthogonal vector sequence (S441). The positions of Vn2 to V2 are expressed as ↑VCT={V0, V1, V2, . . . Vn2, Vn1). Then, the rotational direction from V0 to V1 is checked (S442). If the direction is counterclockwise, the program proceeds to steps S444 et seq., whereas if not, the present orthogonal vector value V0 is determined as a diagonalized vector value, and the positions of respective elements in the orthogonal vector sequence to be checked are each shifted to an immediately following vector element position (S443).

In the present embodiment, the positions of Vn2 to V2 are each shifted by one, whereby ↑VCT=(V0, V1, V2, ... Vn2, Vn1) is changed to ↑VCT=(Vn1, V0, V1, V2, ... Vn2).

At the step S444, vector change directions between the respective sequential two of the vector elements Vn2 to V3 are calculated by the use of the following equation (1) in the C language:

$$dr(V[n-1]V[n])=(V[n]-V[n-1]+10) \text{ AND } 0 \times 07 \quad (1)$$

As a result of the calculation, "0" represents counterclockwise rotation, "2" an identical direction, "4" clockwise rotation, and "6" an opposite direction (impossible).

Then, respective forward and rearward change directions with respect to the present vector are separately weighted by the use of the following equations (2) and (3) (S445).

$$W1 \text{ (weight for a rearward direction of change)}=\{dr(V1-V2)\times3+dr(V2 \rightarrow V3)\}/2 \quad (2)$$

$$W2 \text{ (weight for a forward direction of change)}=\{dr(Vn1-V0)\times3+dr(Vn2 \rightarrow Vn1))/2 \quad (3)$$

Thereafter, the diagonalization-determining table 132 is looked up to retrieve a value corresponding to the calculated weights W1 and W2 (S446). If the value is "1" at a step S447, the present vector is diagonalized by the use of the following equation (4) in the C language and put into the diagonalized vector sequence.

$$\text{diagonalized vector value}=(\text{present vector value}+0 \times 07) \text{ AND } 0x07 \quad (4)$$

As a result of the calculation, "0" is converted to "7", "2" to "1", "4" to "3", and "6" to "5". Further, since an element immediately after an orthogonal vector element diagonalized is included in the diagonalized vector (diagonal vector), the element position in the orthogonal vector sequence to be checked is shifted by two vector elements (S448).

On the other hand, if the value is "0" at the step S447, the present orthogonal vector value V0 is judged to be a diagonalized vector value, and the element positions in the orthogonal matrix to be checked are each shifted to an immediately following vector element position (S449). Then, the steps S441 to S449 are repeatedly carried out until the element position to be processed is shifted to the leading position of the orthogonal vector sequence (S450).

In this connection, starting point-shifting processing executed in the case of the last orthogonal vector being diagonalized is carried out as follows. When the last and leading vector elements of the orthogonal matrix are diagonalized (i.e. when the vector elements V0 and V1 of the orthogonal matrix ↑VCT={V1, V2, ..., Vn2, Vn1, V0} are diagonalized), the leading vector diagonalized and put into the diagonalized vector sequence is deleted from the orthogonal vector sequence, and a coordinate point shifted from the starting point in a deleting direction is set to a new starting point.

FIG. 21 shows the contents of the diagonalization-determining table 132. The diagonalization-determining table 132 stores data for determining whether or not diagonalization should be executed, in an manner associated with values indicated by the weights W1, W2 obtained from the weight calculation performed as described above. Patterns of diagonalization can be modified by changing values in the table.

An example of vector diagonalization will be described with reference to FIGS. 22A, 22B. FIG. 22A shows diagonalized vector data (diagonal vector sequence) generated when a first starting point is determined, while FIG. 22B shows diagonalized vector data (diagonal vector sequence) generated when a second starting point is determined.

In FIG. 22A, the coordinates of the starting point are [6, 2], and the diagonalized vector data (diagonal vector sequence) is expressed as ↑VCT1B=[0, 0, 0, 0, 0, 0, 0, 0, 0, 1, 0, 1, 1, 2, 1, 2, 2, 2, 2, 2, 2, 2, 3, 2, 3, 3, 4, 3, 4, 4, 4, 4, 4, 4, 4, 4, 6, 6, 6, 6, 6, 6, 6, 6, 6, 6, 6, 6, 6, 6, 6, 6].

In FIG. 22B, the coordinates of the initial starting point are [15, 5], and the diagonalized vector data (diagonal vector sequence) is expressed as ↑VCT2B=[4, 4, 4, 4, 4, 2, 2, 2, 2, 2, 2, 2, 2, 2, 2, 2, 2, 0, 0, 0, 0, 0, 7, 7, 7, 6, 6, 6, 6, 6, 6, 5, 5, 5].

In the FIG. 22B process, the leading vector deleted by diagonalization of the ending vector and the leading vector is "4", and hence the starting point is shifted by [−1, 0], which set a new starting point of coordinates [14, 5].

Next, description is made of the line-drawing process (S45 in FIG. 4) including dot correction, which is executed by the line-drawing section 114. The line-drawing process includes the processing for correcting outline coordinates and the processing for drawing a line between each adjacent pair of two outline coordinate points after the correction. The following description will be made with reference to a FIG. 8 flowchart showing a routine for line drawing.

First, the processing for correcting outline coordinates will be described. In this processing, the coordinates of starting and ending points of each vector are obtained from the diagonal vector sequence extracted from the original bitmap, and a line (outline) is drawn between the two points in a new bitmap area (working bitmap area 134) enlarged in the X and Y directions. The coordinates of the starting and ending points of each vector are corrected in dots with reference to a sequence of six vector elements in the diagonal vector sequence. In the processing, two kinds of outlines, i.e. a stroke edge line and a line for filling processing are generated. For this reason, two enlarged bitmap areas are required for the outline processing.

First, basic outline coordinates are determined from the starting point and the value of each vector (S451). Here, arithmetic operation is performed for determining the basic outline coordinates based on which correction data is looked up.

More specifically, assuming that scaling factors in the X and Y directions are set to BX and BY, respectively, and the coordinates of an original starting point are X0 and Y0, a starting point [X1, Y1] after scale-up of the bitmap is determined by [BX×X0, BY×Y0]. In the following arithmetic operations for determining basic outline coordinate points, each coordinate point is obtained by adding shift amounts determined based on the value of a diagonalized vector (orthogonal or diagonal vector) from the corresponding immediately preceding coordinate point (starting point of the diagonal vector sequence when this process is first carried out) to the coordinates of the immediately preceding coordinate point. FIG. 23 shows the relationship between each diagonalized vector value and the corresponding shift amount as Table 9.

An example of the basic outline coordinates is shown below. Assuming that the original starting point coordinates [X0, Y0] are [6, 2], and the original diagonalized vector sequence generated by the diagonal-vectorization section 113 is expressed as ↑VCT1B=[0, 0, 0, 0, 0, 0, 0, 0, 0, 1, 0, 1, 1, 2, 1, 2, 2, 2, 2, 2, 2, 2, 3, 2, 3, 3, 4, 3, 4, 4, 4, 4, 4, 4, 4, 4, 6, 6, 6, 6, 6, 6, 6, 6, 6, 6, 6, 6, 6, 6, 6, 6], starting point coordinates [X1, Y1] obtained after the enlargement or scale-up of the original diagonal vector sequence by scaling factors BX=2 and BY=3 are [12, 6], and the following coordinate points are determined by arithmetic operations shown in Table 10 in FIG. 24.

In order to obtain bitmap data from the outline, lines are drawn sequentially between respective two coordinate points shown in Table 11 in FIG. 25. However, in the processing, all the diagonal lines are drawn at 45-degree angle, so that it is impossible to obtain bitmap data having a smoothed contour. Therefore, the outline is corrected in units of dots with reference to data of preceding and following vector elements to smooth the contour of the bitmap data.

More specifically, after the basic outline coordinates are determined, processing for correcting the basic coordinates is executed based on the correction data at steps S452 et seq. In this processing, the outline coordinate points for use in drawing lines are determined by correcting the basic outline coordinate points obtained as above, by the correction data with reference to vector values of the preceding and following basic outline coordinate points. The correction includes three types, i.e. "no correction" in which a basic coordinate point is directly used as a coordinate point for drawing a line, "skip" in which a reference coordinate point is not used for the present loop, but stored for the following loops, and "dot correction" in which reference coordinate points are shifted in units of dots. It should be noted that the correction data includes values each determined based on patterns of vector values of preceding and following coordinate points. The correction table 133 stores the values of the correction data.

In the following, description will be made of a method of referring to the correction data. Prior to the description, a present vector and preceding and following vectors anterior are defined as follows. In a diagonal vector sequence ↑VCTB={ . . . VCTB[n-3], VCTB[n-2], VCTB[n-1], VCTB[n], VCTB[n+1], VCTB[n+2] . . . }, a sequence of six vector elements VCTB[n-3], VCTB[n-2], VCTB[n-1], VCTB[n], VCTB[n+1], and VCTB[n+2] are defined, respectively, as Vn3 (third preceding vector), Vn2 (second preceding vector), Vn1 (immediately preceding vector), V0 (present vector), V1 (immediately following vector), and V2 (second following vector).

First, it is checked whether the present vector V0 is an orthogonal vector (0, 2, 4, or 6) or a diagonal one (1, 3, 5, or 7). If the present vector is an orthogonal one, a flag a0 is set to "0", whereas if the present vector is a diagonal one, the flag a0 is set to "1".

Then, vector change directions between each pair of vector elements Vn2 to V3 are calculated by the use of the following equation (5) in the C language (S452):

$$dr(V(n-1) \to V(n)) = (V(n) - V(n-1) + 10) \text{ AND } 0x07 \qquad (5)$$

Values obtained by the calculation of dr represent the vector change directions as follows: "0" for counterclockwise rotation, "1" for counterclockwise rotation through 45 degrees, "2" for an identical direction, "3" for clockwise rotation through 45 degrees, "4" for clockwise rotation, "5" for clockwise rotation through 135 degrees (impossible), "6" for an opposite direction (impossible), and "7" for counterclockwise rotation through 135 degrees (impossible).

Then, an address addr of the table 132 storing correction data corresponding to the present vector is calculated by the use of the following equation (6) (S453):

$$addr = 1250 \times dr(V1 \to V2) + 250 \times dr(V0 \to V1) + 125 \times a0 + 25 \times dr(Vn3 \to Vn2) + 5 \times dr(Vn1 \to V0) \qquad (6)$$

Then, the correction data corresponding to the present vector is obtained as an addr-th byte of correction data H.

The correction data H assumes any one of nine values "0" to "8". The value "0" represents "nocorrection" (S456), and the value "8" "skip" in which a basic coordinate point determined based on the present vector is not used for line drawing in the present loop, but stored for line drawing in the immediately following loop et seq. (S458). When the correction data H assumes any one of the values "1" to "7", an outline coordinate-correcting process, described in detail hereinafter, is executed for correcting coordinate positions in units of dots. The relationship between the correction data H and the direction of correction is shown in FIG. 26 as Table 12.

A method of correcting outline coordinates is now explained. A direction Hdr of correction is calculated by the use of the following equation (7) (S457):

$$Hdr = (H + V0 + 7) \text{ AND } 7 \qquad (7)$$

Then, the number of correction dots in each of the X and Y directions is determined following Table 13 shown in FIG. 27 (S459). HX and HY in Table 13 each represent the number of correction dots set dependent on a scaling factor. HX and HY are each limited to a value which is equal to or smaller than half of a value of the corresponding scaling factor so as to prevent connection of corrected lines adjacent to each other. Table 14 in FIG. 28 shows the number of correction dots for each scaling factor. Coordinates shifted by the number of correction dots from the basic coordinates determined based on a present vector are set to coordinates for use in line drawing (S480).

The above vector calculation determines an address of the table 132 storing correction data, but not a correction data item itself specified by the address. In the present embodiment, each correction data item is obtained by searching the correction table 132 which is a set of individual correction data items each determined in advance, based on patterns of a sequence of vector values. According to this method, e.g. by preparing correction data on a font-by-font basis, outline smoothing processing can be executed in a manner adapted to features of each font.

The dot correction will be described by taking two cases as examples.

In one of the examples shown in FIG. 29 as Table 15, on condition that the starting coordinates [X0, Y0] are [6, 2], and the diagonalized vector sequence (diagonal vector sequence) is expressed as ↑VCT1B=[0, 0, 0, 0, 0, 0, 0, 0, 0, 1, 0, 1, 1, 2, 1, 2, 2, 2, 2, 2, 2, 2, 2, 3, 2, 3, 3, 3, 4, 3, 4, 4, 4, 4, 4, 4, 4, 4, 4, 6, 6, 6, 6, 6, 6, 6, 6, 6, 6, 6, 6, 6, 6, 6, 6], a character enlarged by a factor of three in the X direction and by a factor of four in the Y direction is subjected to line-drawing processing with X-direction correction dot value set to "1" and Y-direction correction dot value set to "2". In the table, LINE {(X1, Y1)–(X2, Y2)} represents processing for drawing a line between the coordinate points (X1, Y1) and (X2, Y2). Further, LINE SKIP represents that line-drawing processing is skipped.

In the other example shown in FIG. 30 as Table 16, on condition that the starting coordinates are [14, 5], and the diagonalized vector sequence (diagonal vector sequence) is expressed as ↑VCT2B=[4, 4, 4, 4, 4, 2, 2, 2, 2, 2, 2, 2, 2, 2, 2, 2, 2, 0, 0, 0, 0, 0, 7, 7, 7, 6, 6, 6, 6, 6, 6, 5, 5, 5], a character enlarged by a factor of three in the X direction and by a factor of four in the Y direction is subjected to line-drawing processing with X-direction correction dot value set to "1" and Y-direction correction dot value set to "2".

The line-drawing processing to be executed at steps S480 et seq. is now described. In the line-drawing processing, a portion of the work RAM (storage space) is allocated to two data areas each having a size equal to a product of the size of original bitmap data multiplied by scaling factors in the respective X and Y directions, and a stroke edge line and a line for filling processing are drawn between each pair of coordinate points determined as described above for line drawing, while carrying out dot interpolation, i.e. adding dots for interpolation between the pair of coordinate points. A stroke edge line is hereinafter referred to as "a stroke line", and an area for drawing stroke lines as "a stroke area", while a line for filling processing is referred to as "a fill line", and an area for drawing fill lines as a "fill area". Further, two points between which the lines are drawn are represented by P1=(X1, Y1) and P2=(X2, Y2), respectively.

First, stroke line-drawing processing will be described. In the processing, a stroke line is drawn by adding or interpolating dots between two coordinate points determined as described above for line drawing. Depending on a slope of a line to be drawn, a base axis is changed for a smoother line at a step S482, for dot interpolation.

More specifically, to set one of the X and Y coordinate axes along which a large displacement occurs to a basic axis for line drawing, difference in respective X and Y values between the two points, i.e. $\Delta X=ABS(X2-X1)$ and $\Delta Y=ABS(Y2-Y1)$ (where ABS represents a function for determining an absolute value) are calculated, and then, if $\Delta X \geq \Delta Y$ holds, the X axis is selected as a basic axis, and scan is performed in the X direction, whereas if $\Delta X < \Delta Y$ holds, the Y axis is selected as a basic axis, and scan is performed in the Y direction.

In the X axis-based line-drawing processing (X-direction scan), the coordinate values X1 and X2 of the two points P1, P2 are compared with each other, and dots are plotted sequentially from one point of the points with the smaller X-coordinate value toward the other with the larger X-coordinate value. When $X1 \geq X2$ holds, dots are plotted sequentially from P2 toward P1 (starting point PS=P2, ending point PE=P1), whereas when X1<X2 holds, dots are plotted sequentially from P1 toward P2 (starting point PS=P1, ending point PE=P2).

On the other hand, in the Y axis-based line-drawing processing (Y-direction scan), the coordinate values Y1 and Y2 of the two points P1, P2 are compared with each other, and dots are plotted sequentially from one of the points with the smaller Y-coordinate value toward the other with the larger Y-coordinate value. When $Y1 \geq Y2$ holds, dots are plotted sequentially from P2 toward P1 (starting point PS=P2, ending point PE=P1), whereas when Y1<Y2 holds, dots are plotted sequentially from P1 toward P2 (starting point PS=P1, ending point PE=P2).

In the stroke line-plotting processing, dots are plotted on a starting point, an ending point, and interpolated points, respectively, and a logical OR operation is performed between the dots and data in the stroke area.

Next, fill line-drawing processing will be described. In this processing, a fill line is drawn by interpolating dots between two coordinate points determined as described above for line drawing. In this case, only the X axis is used as a basic axis for dot interpolation.

More specifically, in the X axis-based line-drawing processing (X-direction scan), the coordinate values X1 and X2 of the two points P1, P2 are compared with each other, and dots are plotted sequentially from one point of the points with the smaller X-coordinate value toward the other with the larger X-coordinate value (S484). When $X1 \geq X2$ holds, dots are plotted sequentially from P2 toward P1 (starting point PS=P2, ending point PE=P1), whereas when X1<X2 holds, dots are plotted sequentially from P1 toward P2 (starting point PS=P1, ending point PE=P2). In the fill line-drawing processing, dots are plotted on the starting point and the interpolated points, respectively, but the ending point is left unprocessed. Further, an exclusive-OR operation (XOR) is performed between the dots and data in the fill area (S485).

An algorithm used for drawing a line between two points in the stroke line-plotting processing and the fill line-drawing processing will be described in detail with reference to FIGS. 31 to 41.

Figure 31:
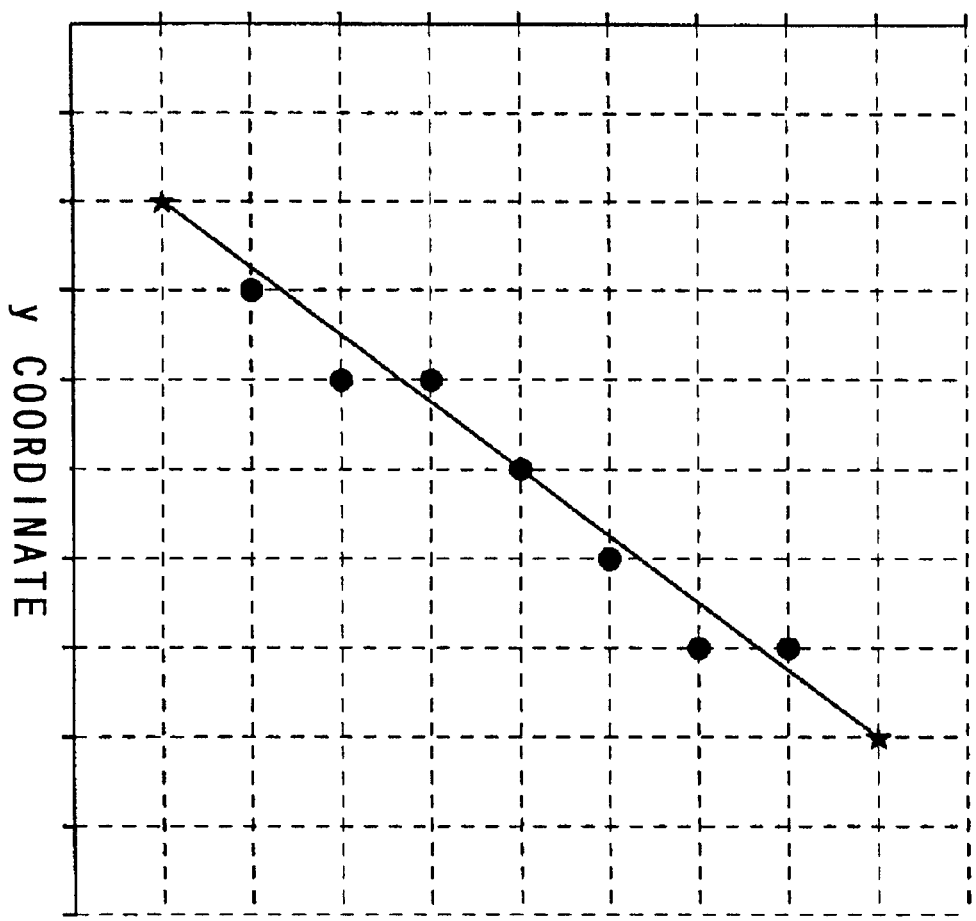
FIG. 31 is a graph (Graph 1) which is useful in explaining dot interpolation.

In the illustrated example of Graph 1 in FIG. 31, in drawing a straight line between two points (represented by ★ in the figure), it is impossible to plot dots at respective coordinate points which have decimal coordinate values and hence correspond to respective addresses in decimal numbers in a memory, as in the case of drawing a straight line on a graph. Actually, as shown in the figure, dots (represented by ● in the figure) are interpolated between the two points such that they are plotted on respective coordinate points having integer values closest to the values of the corresponding coordinate points having decimal values on the straight line.

Such groups of interpolated points can be obtained sequentially based on an algorithm shown in FIG. 32 as List 1. In the list, a group of interpolated dots is represented by (x+x1, y). More specifically, whenever x is incremented by 1, an arithmetic operation is performed for rounding the corresponding y value having a decimal point up or down to an integer value closest thereto. Although in the example shown in FIG. 32, rounding is employed, it is possible to use the normal four arithmetic operations. In this case, an algorithm shown in FIG. 33 as List 2 can be obtained. Here, a group of interpolated dots is represented by (x, y).

When calculation by equations shown in FIG. 33 is executed by a program, there occurs no problem. However, when an attempt is made to carry out the operation by hardware, inconvenience occurs due to elements contained in the equations, such as division of dy/dx, a variable having a decimal point, comparison with 1/2, and so forth. To eliminate these inconveniences, the algorithm is modified as shown in List 3 in FIG. 34 or List 4 in FIG. 35. However, the lists shown in FIGS. 32 to 35 are not directly related to the present embodiment, and hence description thereof is omitted.

Figure 36:
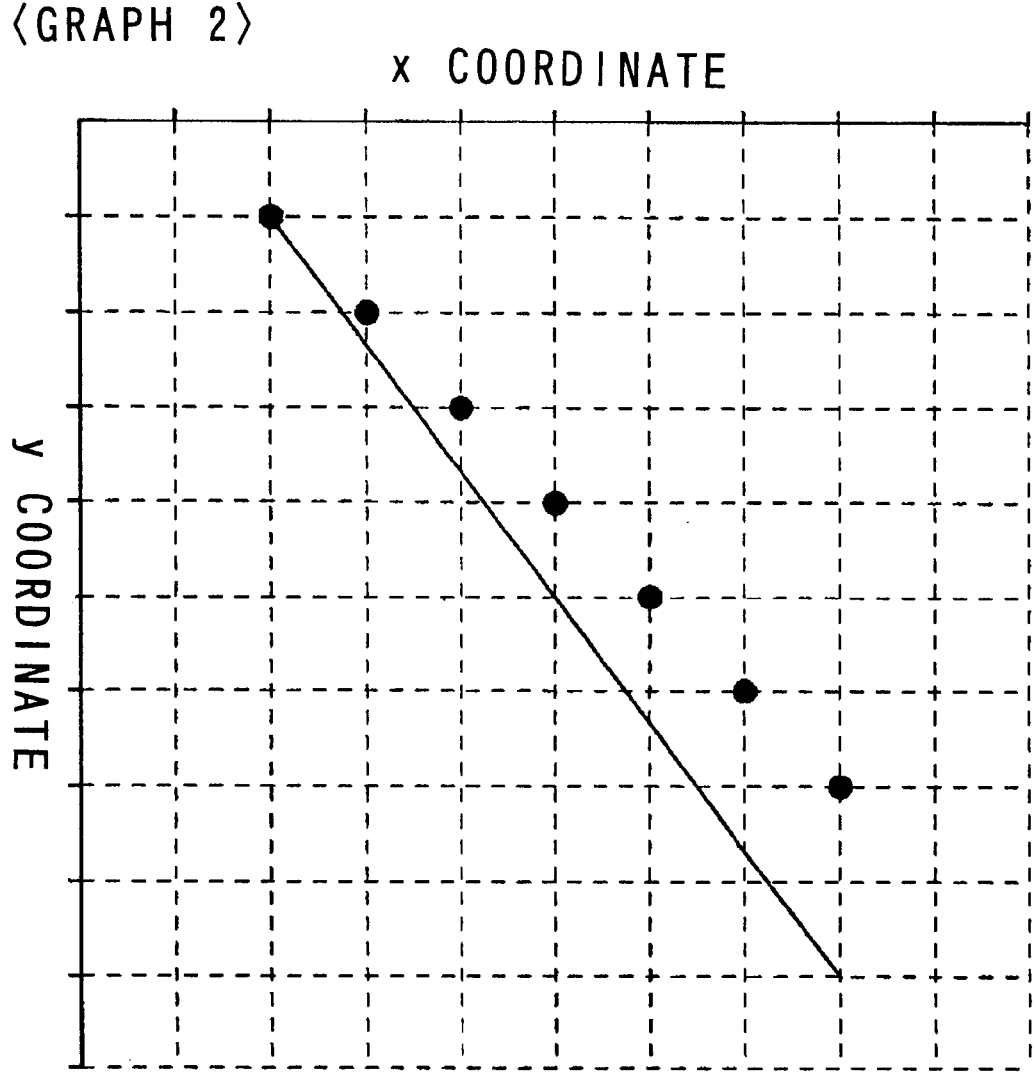
FIG. 36 is a graph (Graph 2) which is useful in explaining dot interpolation.

The above description has been made assuming that dx>=dy holds. Based on this assumption, it is determined "whether or not y should be incremented by 1" whenever x is incremented by 1. Therefore, the above described algorithms are not applicable when the increment dy/dx is larger than "1". If the calculation were performed on condition that dx<dy holds, the result would be as shown in FIG. 36 in the form of a graph (Graph 2) (positive direction along the Y coordinate axis=downward direction).

Figure 38:
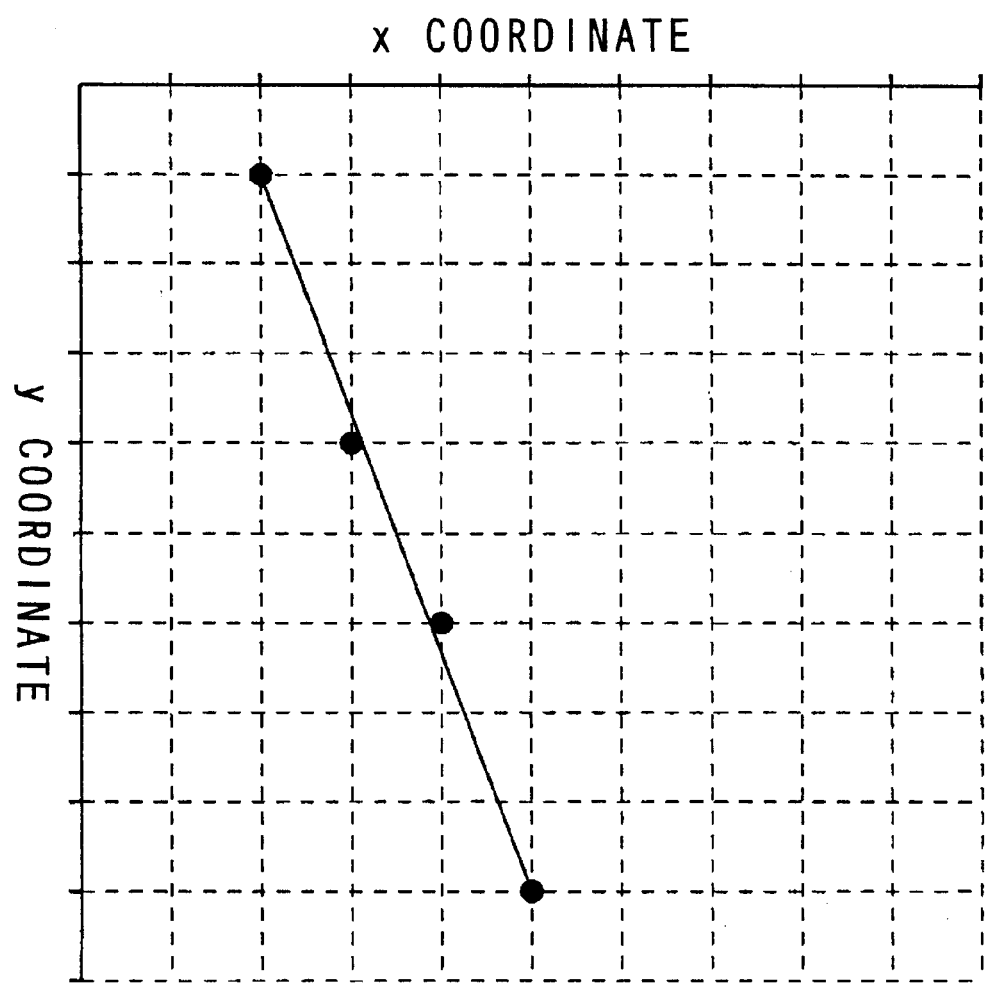
FIG. 38 is a graph (Graph 3) which is useful in explaining dot interpolation.

To avoid this, it is only required to repeatedly carry out comparison between 1 and dx. In this case, an algorithm shown in FIG. 37 as List 5 is employed. This algorithm makes it possible to obtain a group of coordinate points most similar to a straight line, as shown in FIG. 38 in the form of a graph (Graph 3), even if the increment dy/dx is larger than "1".

Figure 39:
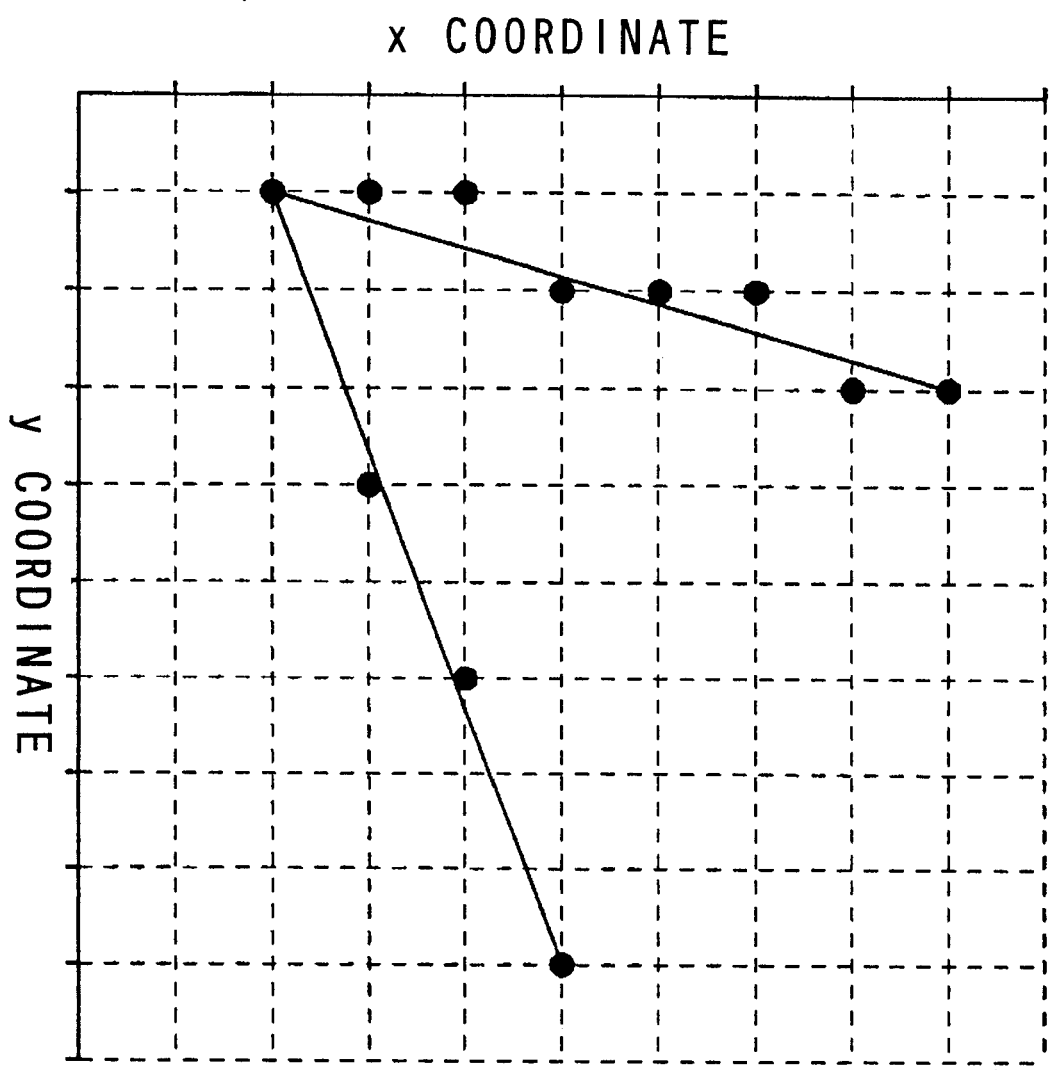
FIG. 39 is a graph (Graph 4) which is useful in explaining dot interpolation.
Figure 41:
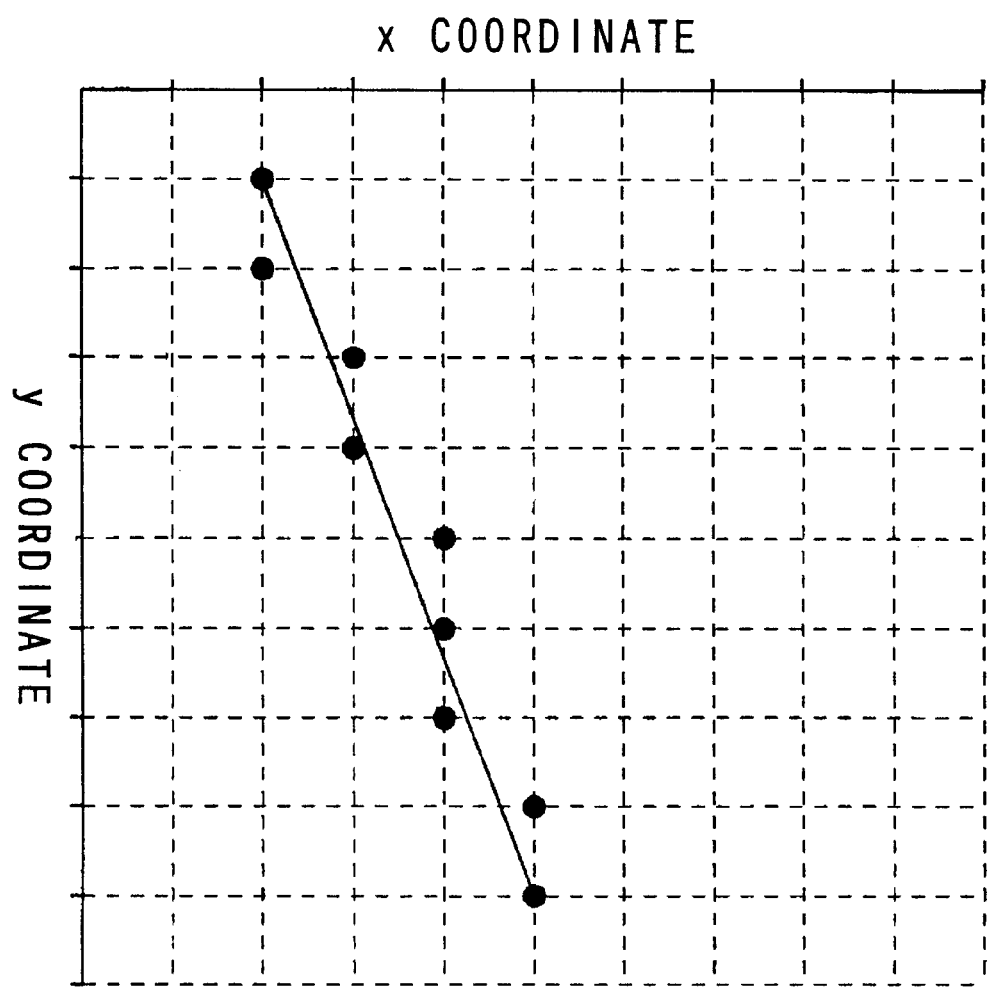
FIG. 41 is a graph (Graph 5) which is useful in explaining dot interpolation.

As described above, even when dx<dy holds, it is possible to generate a straight line by the above algorithm. However, when dx is much smaller than dy (i.e. when the slope of a straight line is sharp), interpolated dots are excessively reduced in number as shown in FIG. 39 in the form of a graph (Graph 4).

Actually, the above algorithm is useful for filling processing. However, when the algorithm is used for line drawing which is carried out for the purpose of obtaining stroke edge lines, the outline of font data will be formed of densely-dotted portions and sparsely-dotted portions, and hence it cannot be expected to obtain font data having a nice-looking contour.

To obtain a dense group of interpolated dots irrespective of the slope of a line, it is required to carry out the processing differently, depending on which is larger between dx and dy. If dx<dy holds, the X axis and the Y axis are interchanged, and then the above operation is carried out. More specifically, whenever y is incremented by "1", it is determined whether or not x should be incremented by "1", whereby the increment dy/dx or dx/dy is normalized below "1". In this case, the algorithm is expressed as in List 6 shown in FIG. 40. According to this algorithm, as shown in a graph (Graph 5) of FIG. 41, dots are densely interpolated between the two points.

The algorithm for drawing a stroke line can be summarized as follows. When dx>=dy holds, processing (X scan line-drawing processing) is carried out to determine whether or not y should be incremented by "1" whenever x is incremented by "1". On the other hand, when dx<dy holds, processing (Y scan line-drawing processing) is carried out to determine whether or not x should be incremented by "1" whenever y is incremented by "1", and a logical OR operation is performed between the corresponding starting point, ending point, and interpolated points and the corresponding data in the stroke area.

Figure 43A:
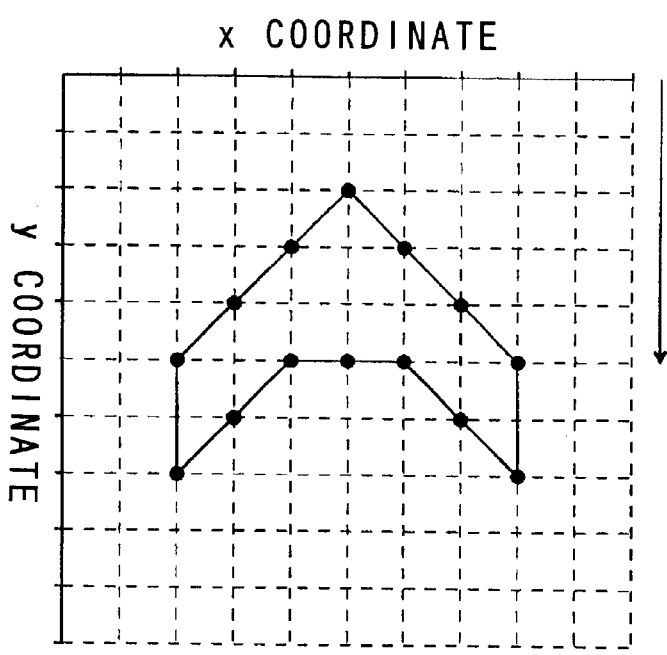
FIGS. 43A and 43B show graphs (Graph 6) which are useful in explaining the stroke line-based filling processing.
Figure 43B:
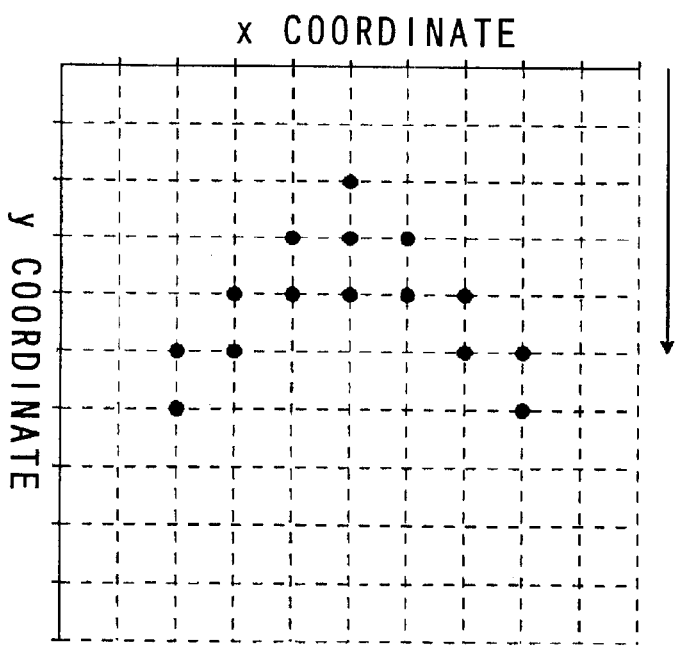

Next, description will be made of filling processing using a stroke line. As shown in FIG. 42 as List 7, an algorithm for filling processing is realized through execution of an exclusive-OR (XOR) operation between one dot and the immediately preceding dot in the Y direction. If this operation is carried out for processing an image exemplified in FIG. 43A as Graph 6, dots are obtained as shown in FIG. 43B, and hence there occurs no serious problem.

Figure 44A:
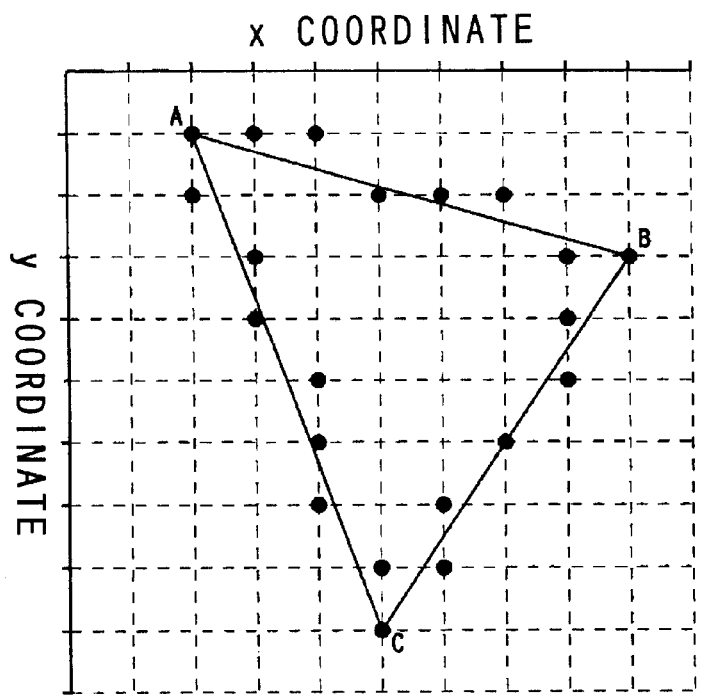
FIGS. 44A and 44B shows other graphs (Graph 7) which are useful in explaining the stroke line-based filling processing.
Figure 44B:
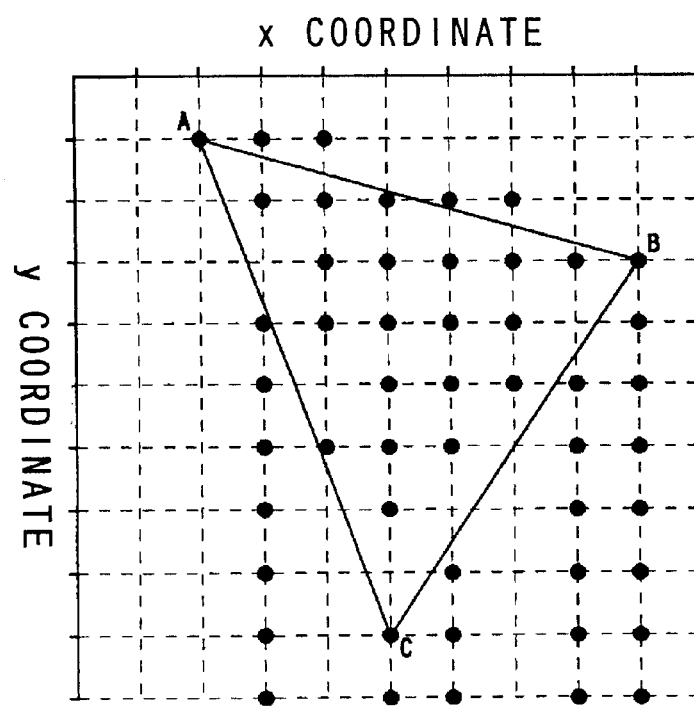
Figure 45A:
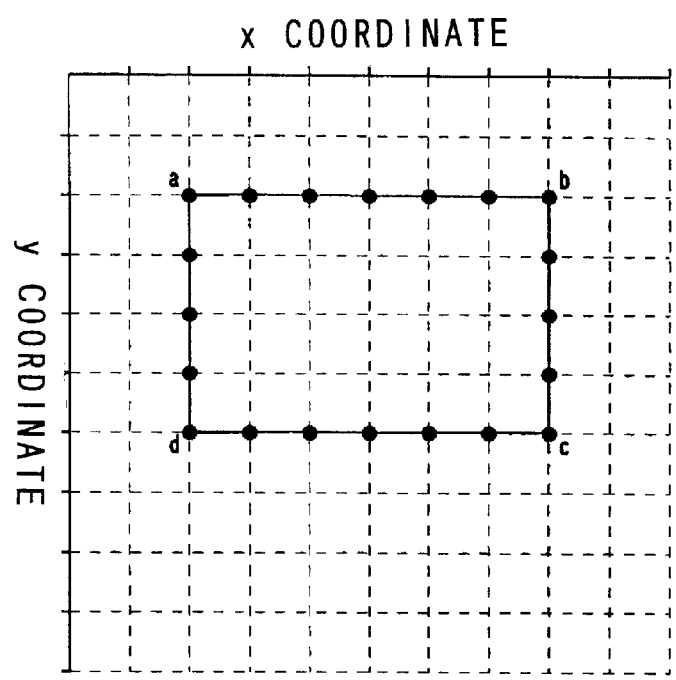
FIGS. 45A and 45B shows graphs (Graph 8) which are useful in explaining the stroke line-based filling processing.
Figure 45B:
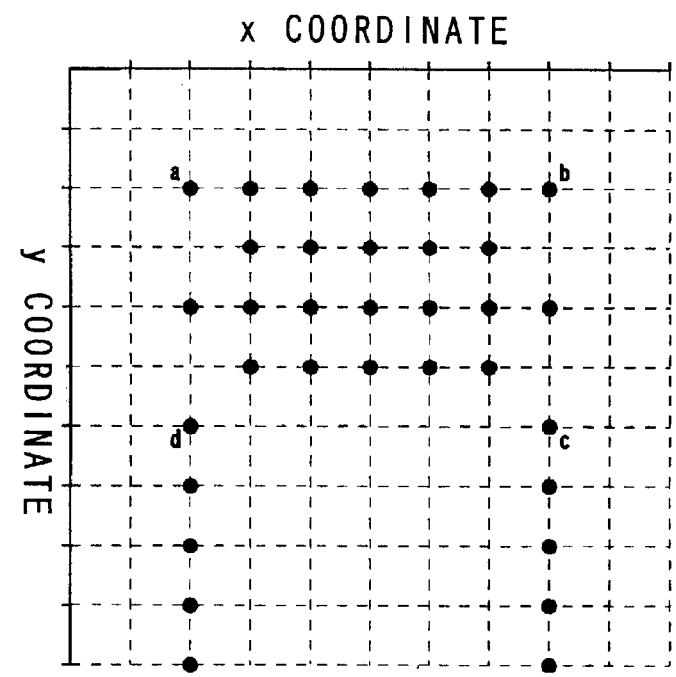

However, if the operation is performed for processing a triangle drawn by the stroke line-drawing processing and exemplified in FIG. 44A as Graph 7, dots are plotted as shown in FIG. 44B, resulting in improper filling. Similarly, in the case of a rectangle shown in FIG. 45A as Graph 8, dots are plotted as shown in FIG. 45B, and hence sides a–d and b–c are not filled properly.

The above problems occur due to the fact that although the object of the filling algorithm is to execute filling processing between one point and another, line segments A–C, B–C (FIG. 44A) and a–d, b–c (FIG. 45A) in the above example are plotted using more than one dot in the Y direction i.e. in the filling direction to draw portions corresponding to respective X coordinate values. The segments A–C, B–C are plotted using more than one dot because the Y scan line-drawing processing is executed. Therefore, this problem can be solved by carrying out the X scan line-drawing processing irrespective of the slope of a line.

Figure 46A:
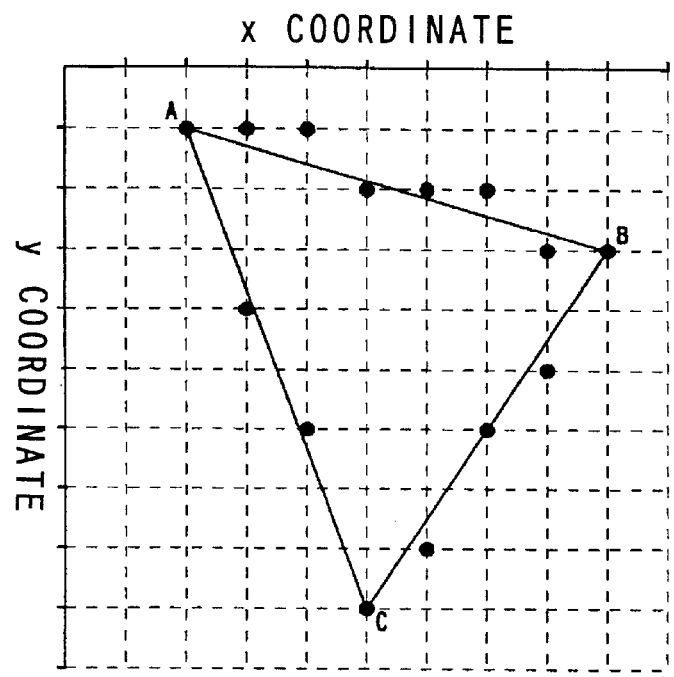
FIGS. 46A and 46B shows graphs (Graph 9) which are useful in explaining filling processing carried out based on an X scan line-drawing method.
Figure 46B:
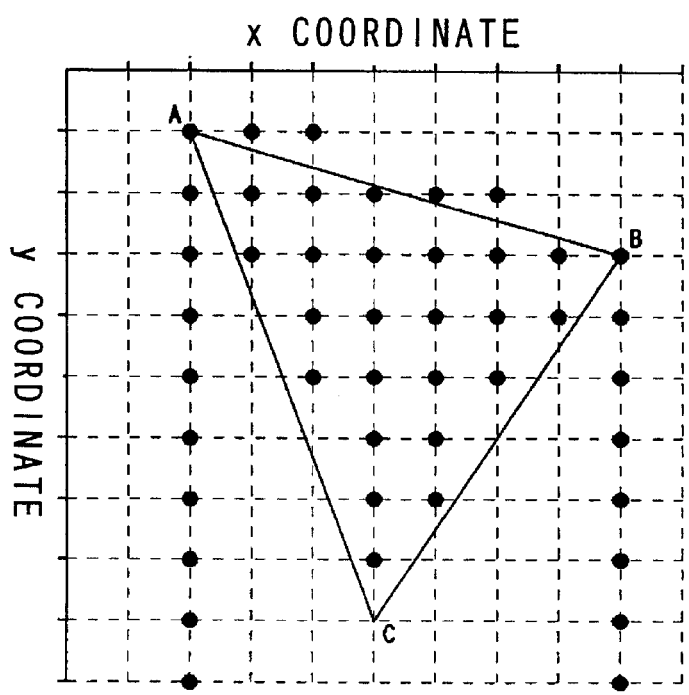

Let it be assumed that a triangle (Graph 9) shown in FIG. 46A, in which the X scan line-drawing processing is simply performed between respective two coordinate points, is subjected to filling processing. In this case, as shown in FIG. 46B, a better result can be obtained in comparison with the case using both the X scan line-drawing processing and the Y scan line-drawing processing. However, since vertices A, B of the triangle are each plotted with a single dot, there exists no filling ending point corresponding to each of the vertices A, B, and hence lines are drawn from the respective points A, B.

Now, the fill line-drawing processing according to the present embodiment will be described. In FIG. 46B, since each of the points A, B is a vertex of the triangle, it is impossible to plot a corresponding filling ending point. For this reason, in the line-drawing processing, the vertices A, B are each required to be left as a white point without being plotted with a black dot. In this case, however, if a simple method is employed in which a starting point and the corresponding ending point are each left as a white point, the other vertex C of the triangle is also left as a white point, and as a result, a line continues to be drawn in the Y direction from the point C.

To solve this problem, utilizing a feature of the line drawing processing that a starting point and an ending point are doubly processed in the immediately preceding and present loops or in the present and immediately following loops, i.e. that these points are processed twice, an exclusive-OR operation is performed only between points from a starting point to a group of interpolated points immediately before the corresponding ending point, and the corresponding data in the fill area, and the ending point is left unprocessed. Thus, the vertices can be made white points. An algorithm for generating interpolated points on a fill line is shown in FIG. 47 in the form of a list.

Figure 48A:
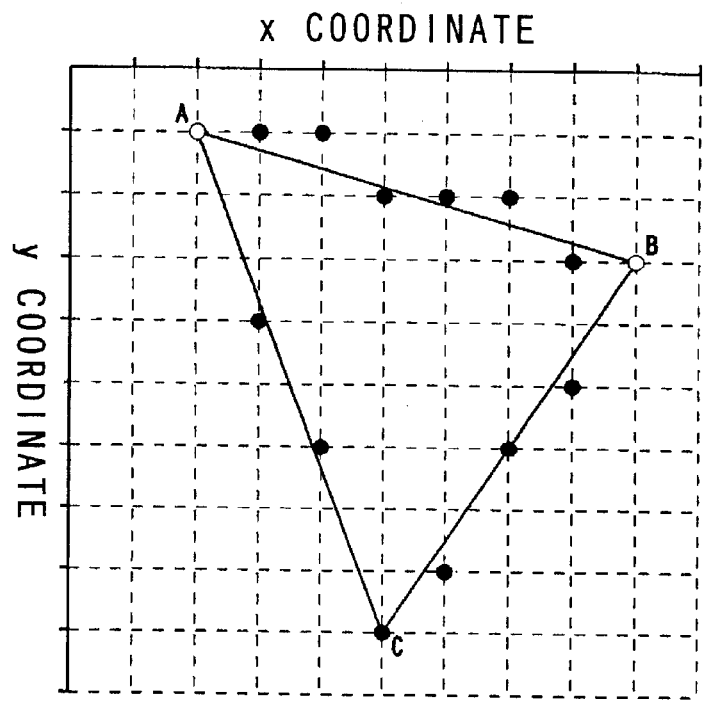
FIGS. 48A and 48B shows graphs (Graph 10) which are useful in explaining filling processing carried out by using a fill line.
Figure 48B:
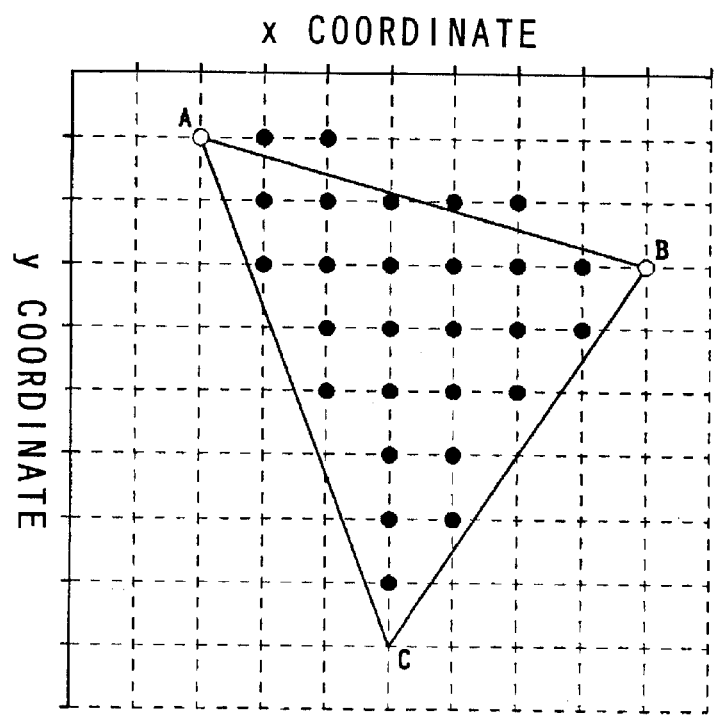

In the fill line-drawing processing, a triangle (with vertices A, B, C) in Graph 10 shown in FIG. 48A is processed as follows. In a process for drawing a fill line A–B in FIG. 48A, the point A is plotted with a black dot, and the point B is left unprocessed (as a white dot). In the following process for drawing a fill line C–B, the point C is plotted with a black dot, and the point B is left unprocessed (as a white dot). Further, in a process for drawing a fill line A–C, the point A is changed to a white dot as a result of an exclusive-OR operation, and the point C is left unprocessed as a black dot. Then, when the triangle shown in FIG. 48A is subjected to filling processing, the filled triangle shown in FIG. 48B can be obtained.

The algorithm for drawing a fill line can be summarized as follows. First, between two coordinate points to be processed, one having a smaller X coordinate value is selected as a starting point. Then, whenever x is incremented by "1", it is determined whether or not y should be incremented (i.e. the X scan line-drawing processing is carried out). Further, an exclusive-OR operation is performed between points from the starting point to a group of interpolated points and corresponding data in the fill area. The ending point is left unprocessed.

Figure 9:
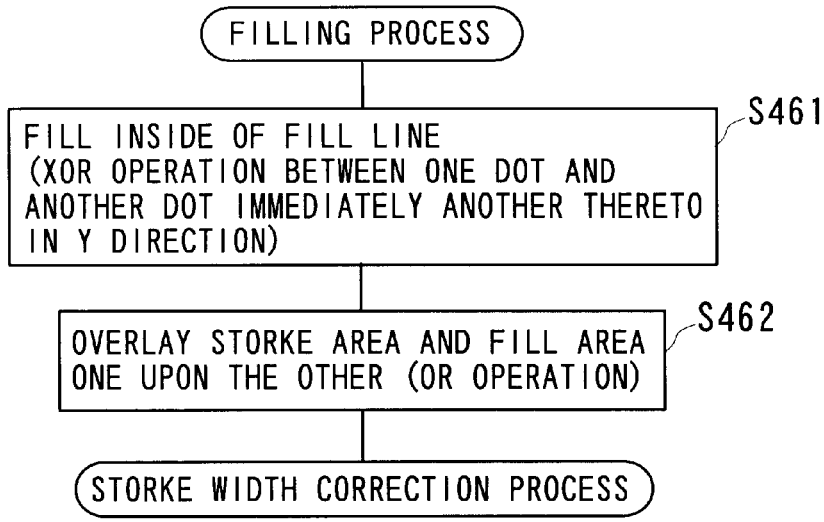
FIG. 9 is a flowchart showing a routine for carrying out a filling process in FIG. 4.

Next, the filling processing to be executed by the filling section 115 at the step S46 in FIG. 4 will be described with reference to a FIG. 9 flowchart showing a routine for carrying out the filling processing.

The filling section 115 fills the inside of each fill line generated by the line-drawing section 114. The filling processing is carried out by executing an exclusive-OR operation between one dot and an immediately preceding dot in the Y direction (S461). An algorithm for the filling processing is shown in FIG. 49 as List 9.

Now, the superimposition between a stroke area and a fill area will be described. In this process, the contents of the stroke area in which the outline of a font is plotted and the contents of the fill area in which the corresponding filled font is plotted are superimposed one upon the other by performing a logical OR operation (S462). FIG. 50 schematically shows how the superimposing operation is carried out.

Figure 10:
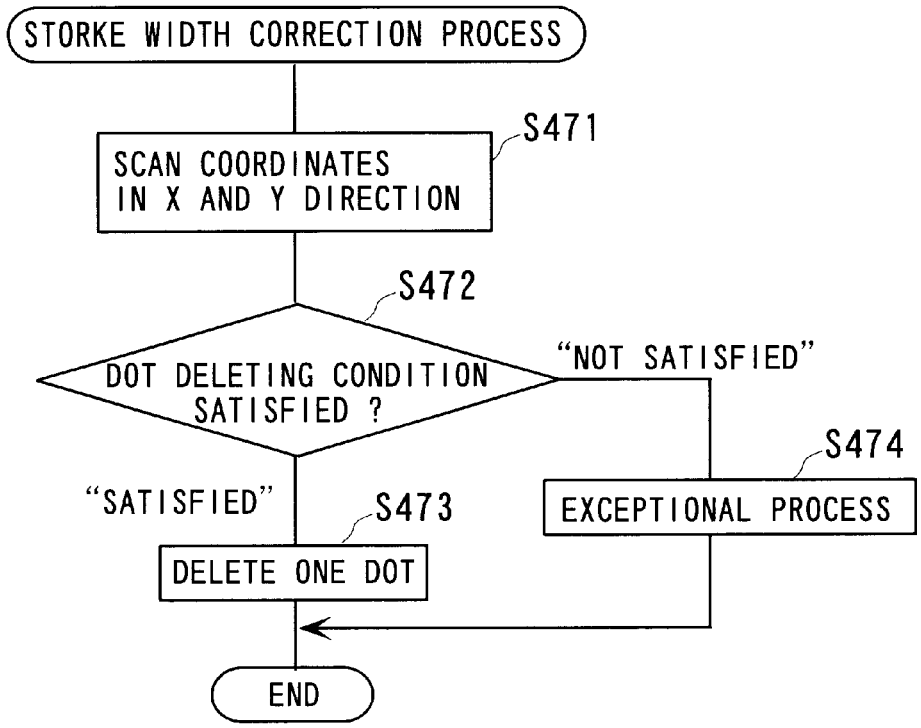
FIG. 10 is a flowchart showing a routine for carrying out a stroke width-correcting process in FIG. 4.

Finally, the stroke width-correcting process executed by the stroke width-correcting section 116 at the step S47 in FIG. 4 will be described with reference to a FIG. 10 flowchart showing a routine for carrying out the process.

A bitmap generated by the line-drawing section 114 is increased in size by one dot line in each of the X and Y directions due to vectorization. To eliminate this inconvenience, the bitmap is reduced in size by one dot line in each of the X and Y directions.

A method of the processing will be described in detail. First, the coordinate points on the bitmap are scanned in the Y direction (S471), and it is determined whether or not each dot satisfies a condition for deleting a dot (S472). Then, dots satisfying the condition are made "white" (S473). The condition for deleting a dot is that a dot at a present coordinate point is "black" and a dot at the immediately following coordinate point (=Y+1) is "white". Each dot at an end coordinate point is left unprocessed.

Then, the coordinate points of the bitmap are scanned in the X direction (S471), and it is determined whether or not each dot satisfies a condition for deleting a dot (S472). Then, dots satisfying the condition are made "white" (S473). The condition for deleting a dot is that a dot at a present coordinate point is "black", and a dot at the immediately following coordinate point (=X+1) is "white". Each dot at an end coordinate is left unprocessed.

Now, description is made of an example of thickness correction (i.e. the stroke width correcting process) with reference to FIGS. 51A to 51D.

Figure 51C:
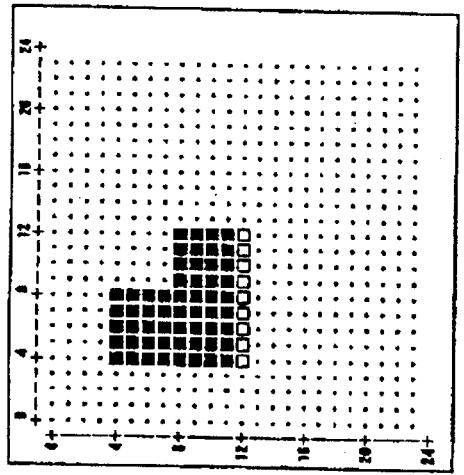
FIGS. 51A to 51D shows an example of thickness corrections as images of bitmaps.
Figure 51D:
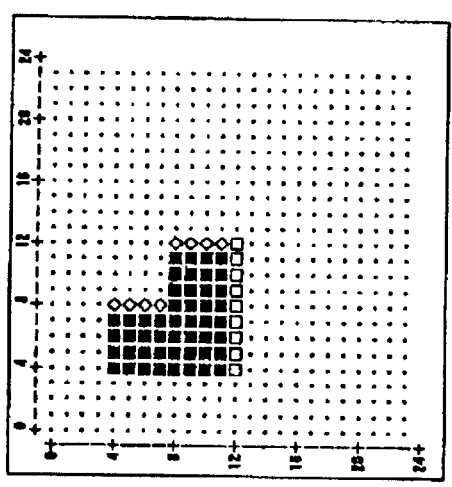
Figure 51A:
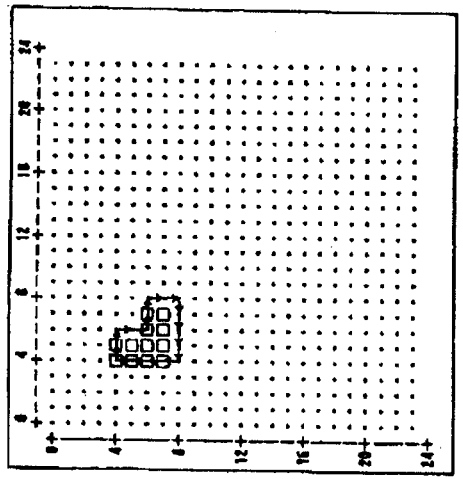

First, the outline is extracted from a bitmap shown in FIG. 51A and enlarged. In the original bitmap, vector data is expressed as ↑VCT1=[0, 0, 2, 2, 0, 0, 2, 2, 4, 4, 4, 4, 6, 6, 6, 6]. When the bitmap is enlarged in the X and Y directions by a scaling factor of two, and line-drawing processing, filling processing, and superimposing processing are sequentially executed, the resulting bitmap is as shown in FIG. 51B.

Figure 51B:
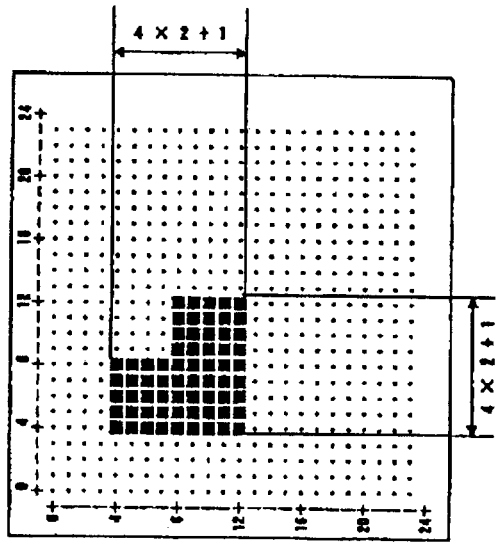

FIG. 51B shows a bitmap obtained by enlargement of the original bitmap in the respective X and Y directions by a scaling factor of two. Therefore, the size or thickness of an image in each of the X and Y directions should have been increased to 4×2=8 dots. Actually, however, as shown in FIG. 51B, the size or thickness of the figure is further increased by one dot in each of the X and Y directions due to vectorization. This increase by one dot is not limitative to the present example, but common to all cases irrespective of the value of a scaling factor(enlargement factor). It should be noted that LINE {(X1, Y1)–(X2, Y2)} in FIG. 51B represents processing of drawing a line from coordinates (X1, Y1) to coordinates (X2, Y2).

To eliminate the inconvenience, the thickness correction is carried out. In the present example, first, the coordinate points on the bitmap are scanned in the Y direction, and then, if F[x, y]=0 x 1 (blackdot) is followed by F[x, y+1]=0 x 0 (white dot), the black dot is replaced by F[x, y]=0 x 0 (white dot). As a result, a bitmap shown in FIG. 51C is generated. More specifically, dots each represented by a symbol □ in the figure are corrected.

Then, the coordinate points in the bitmap are scanned in the X direction, and then, if F[x, y]=0 x 1 (black dot) is followed by F[x, y+1]=0 x 0 (white dot), the black dot is replaced by F[x, y]=0 x 0 (white dot). As a result, a bitmap shown in FIG. 51D is generated. More specifically, dots each represented by a symbol ◇ in the figure are corrected. The operation of thickness correction cause the figure enlarged by the scaling factor of 2 in the X and Y directions to have a proper width of 4×2=8 dots in each of the X and Y directions.

Figure 52A:
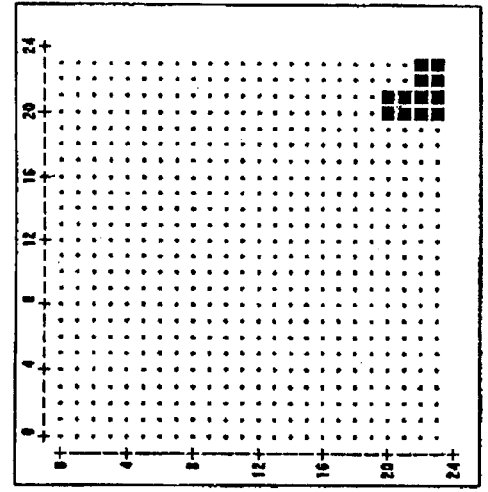
FIGS. 52A to 52D shows an example of exceptional processing for thickness correction as images of bitmaps.

Next, an exceptional process for thickness correction (S474) will be described with reference to bitmaps shown in FIGS. 52A to 52D. FIGS. 52A to 52D show an example of thickness correction to be carried out when original bitmap data having a dot font size of 24×24 is plotted in an area of the bitmap on sides thereof defining the dot font size as shown in FIG. 52A.

Figure 52B:
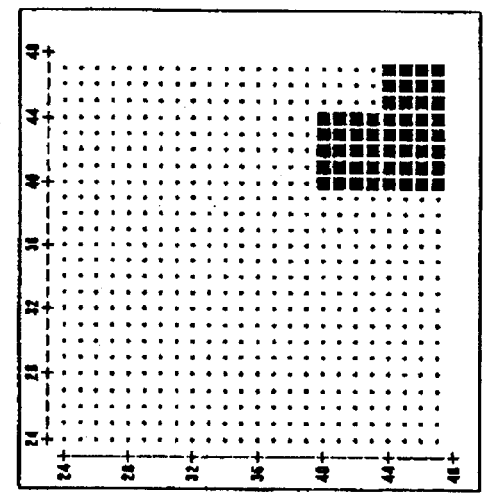

When the bitmap is enlarged in the X and Y directions, by a scaling factor of two, and line-drawing processing, filling processing, and superimposing processing are sequentially executed, a bitmap shown in FIG. 52B is obtained. In this case, the image is partly increased in size by one dot line, but partly not, because each ending point of the image is not plotted by the line-drawing processing when the coordinates thereof are outside the enlarged bitmap.

Figure 52C:
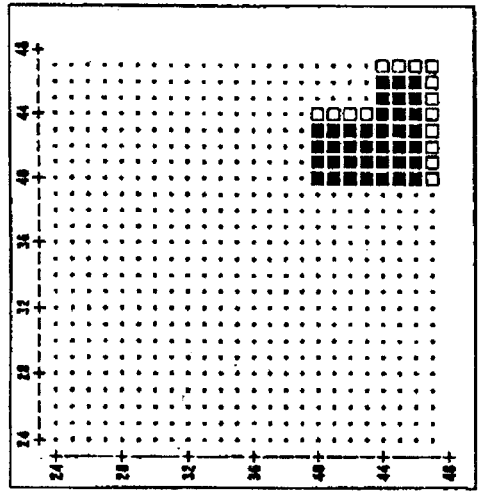
Figure 52D:
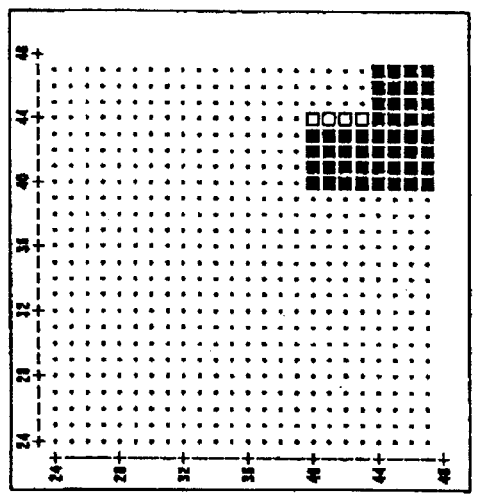

If the figure is subjected to thickness correction directly, a bitmap shown in FIG. 52C is obtained. In this case, the image subjected to the thickness correction is reduced in size by one dot line in each of the X and Y directions. To eliminate this inconvenience, dots of the image plotted at end coordinates of the enlarged bitmap are left unprocessed. This processing makes it possible to obtain a bitmap shown in FIG. 52D. In FIGS. 52C, 52D, symbols □ represent dots to be corrected.

It goes without saying that the object of the present invention may be accomplished by supplying a storage medium in which is recorded a software program realizing the outline smoothing method of the above-described embodiment to a system or apparatus, and causing a computer (CPU or MPU) of the system or apparatus to read out and execute the program stored in the storage medium.

In this case, the code of the program itself read out from the storage medium achieves the novel functions of the present invention, and the storage medium storing the program constitutes the present invention.

The storage medium for supplying the program to the system or apparatus may be in the form of a floppy disk, a hard disk, an optical memory disk, an magneto-optical disk, a CD-ROM, a CD-R (CD-Recordable), a magnetic tape, a nonvolatile memory card, or a ROM, for instance. Also, the program may be supplied from a server computer through a communication network.

It is further understood by those skilled in the art that the foregoing is a preferred embodiment of the invention, and that various changes and modifications may be made without departing from the spirit and scope thereof.

What is claimed is:

1. A method of smoothing an outline of a character image of a bitmapped font defined by bitmap data in a dot matrix format, the method comprising the steps of:
determining coordinates of a starting point of said bitmap data, according to predetermined conditions, said starting point being associated with a start of vector data into which said bitmap data is converted while referring to vectorized dot information indicative of whether or not each dot of said bitmap data has been vectorized;

converting said bitmap data to an orthogonal vector sequence by sequentially determining a direction of each adjacent dot of said bitmap data which is located next to a corresponding preceding dot, starting from said starting point, according to a predetermined order, and converting said each adjacent dot of said bitmap data into a vector of a direction of any of upward, downward, leftward, and rightward directions, with reference to said determined direction, while at the same time updating said vectorized dot information;

converting said orthogonal vector sequence to a diagonal vector sequence based on each sequence of a predetermined number of vectors of said orthogonal vector sequence, with reference to a diagonalization table defining in advance predetermined patterns of said each of sequence which is to be applied for converting a vector of said diagonal vector sequence to a diagonal vector;

carrying out line-drawing processing by producing bitmap coordinate points based on said starting point and said diagonal vector sequence and correcting said bit map coordinate points with reference to a correction data table defining in advance amounts of correction in units of dots in a manner associated with respective patterns of each sequence of a predetermined number of vectors of said diagonal vector sequence;

causing aforementioned steps to be repeatedly carried out until the step of determining said coordinates of a starting point can determine no more starting point, to thereby produce line data representative of results of said line-drawing processing; and producing new bitmap data based on said line data;

wherein the step of carrying out line-drawing processing includes producing data defining an outline of said character image and data defining a line for filling an inside thereof with dots by filling processing, and wherein the step of producing new bitmap data comprises the steps of:

carrying out said filling processing;

superposing data obtained by said filling processing and said data defining said outline one upon another; and carrying out stroke width-reducing processing for reducing a stroke width of said character image increased due to said vectorization.

2. A method of smoothing an outline of a character image of a bitmapped font defined by bitmap data in a dot matrix format, the method comprising the steps of:

determining coordinates of a starting point of said bitmap data, according to predetermined conditions, said starting point being associated with a start of vector data into which said bitmap data is converted while referring to vectorized dot information indicative of whether or not each dot of said bitmap data has been vectorized;

converting said bitmap data to an orthogonal vector sequence by sequentially determining a direction of each adjacent dot of said bitmap data which is located next to a corresponding preceding dot, starting from said starting point, according to a predetermined order, and converting said each adjacent dot of said bitmap data into a vector of a direction of any of upward, downward, leftward, and rightward directions, with reference to said determined direction, while at the same time updating said vectorized dot information;

converting said orthogonal vector sequence to a diagonal vector sequence based on each sequence of a predetermined number of vectors of said orthogonal vector sequence, with reference to a diagonalization table defining in advance predetermined patterns of said each of sequence which is to be applied for converting a vector of said diagonal vector sequence to a diagonal vector;

carrying out line-drawing processing by producing bitmap coordinate points based on said starting point and said diagonal vector sequence and correcting said bit map coordinate points with reference to a correction data table defining in advance amounts of correction in units of dots in a manner associated with respective patterns of each sequence of a predetermined number of vectors of said diagonal vector sequence;

causing aforementioned steps to be repeatedly carried out until the step of determining said coordinates of a starting point can determine no more starting point, to thereby produce line data representative of results of said line-drawing processing; and producing new bitmap data based on said line data;

wherein the step of determining coordinates of said starting point includes scanning dots of said bitmap data sequentially in a predetermined direction, and determining, as said coordinates of said starting point, coordinates of a dot which is not indicated to be vectorized by said vectorized dot information, and at the same time, shows a change from its immediately preceding dot.

3. A method of smoothing an outline of a character image of a bitmapped font defined by bitmap data in a dot matrix format, the method comprising the steps of:

determining coordinates of a starting point of said bitmap data, according to predetermined conditions, said starting point being associated with a start of vector data into which said bitmap data is converted while referring to vectorized dot information indicative of whether or not each dot of said bitmap data has been vectorized;

converting said bitmap data to an orthogonal vector sequence by sequentially determining a direction of each adjacent dot of said bitmap data which is located next to a corresponding preceding dot, starting from said starting point, according to a predetermined order, and converting said each adjacent dot of said bitmap data into a vector of a direction of any of upward, downward, leftward, and rightward directions, with reference to said determined direction, while at the same time updating said vectorized dot information;

converting said orthogonal vector sequence to a diagonal vector sequence based on each sequence of a predetermined number of vectors of said orthogonal vector sequence, with reference to a diagonalization table defining in advance predetermined patterns of said each of sequence which is to be applied for converting a vector of said diagonal vector sequence to a diagonal vector;

carrying out line-drawing processing by producing bitmap coordinate points based on said starting point and said diagonal vector sequence and correcting said bit map coordinate points with reference to a correction data table defining in advance amounts of correction in units of dots in a manner associated with respective patterns of each sequence of a predetermined number of vectors of said diagonal vector sequence;

causing aforementioned steps to be repeatedly carried out until the step of determining said coordinates of a starting point can determine no more starting point, to thereby produce line data representative of results of said line-drawing processing; and producing new bitmap data based on said line data;

wherein the step of carrying out line-drawing processing includes the steps of:

determining a starting coordinate point of a basic outline before correction, based on said starting point, according to predetermined conditions, and then determining each following coordinate point by adding, to a corresponding immediately preceding coordinate point, a shift amount determined based on a value of a vector of said diagonal vector sequence corresponding to said corresponding immediately preceding coordinate point, to thereby set basic outline coordinate points; and correcting said basic outline coordinate points with reference to said correction data table to thereby generate outline coordinate points;

wherein the step of carrying out line-drawing processing further includes the steps of:

producing data defining an outline of said character image by connecting between each successive two of said outline coordinate points by setting dots to a starting point, an ending point, and interpolation points at respective coordinate points which are closest to a straight line between said each successive two of said outline coordinate points and whose coordinates are integers, with one of two orthogonal coordinate axes of a coordinate system of said outline coordinate points being set to a reference axis, said one of said two orthogonal coordinate axes being an axis along which said straight line indicates a larger change in coordinate values than along another of said two orthogonal coordinate axes in dependence on a slope of said straight line; and producing data defining a line for filling an inside thereof with dots by connecting between said each successive two of said outline coordinate points by setting dots to said starting point and said interpolation points, with only a predetermined one of said two orthogonal coordinate axes of said coordinate system being set to a reference axis.

4. A method according to claim 1, wherein the step of superposing data obtained by said filling processing and said data defining said outline one upon another includes performing a logical OR operation of said data obtained by said filling processing and said data defining said outline.

5. A method according to claim 1, wherein the step of carrying out stroke width-reducing processing comprises the step of scanning coordinate points of superposed bitmap data obtained by said superposition of said data obtained by said filling processing and said data defining said outline in a vertical direction to make a present dot white when said present dot is black and at the same time an immediately following dot is white, and scanning said coordinate points of said superposed bitmap data in a horizontal direction to make a present dot white when said present dot is black and at the same time an immediately following dot is white, thereby deleting dots corresponding to a one-dot width in each of said vertical direction and said horizontal direction from said superposed bitmap data representative of said character image having vertical and horizontal widths thereof increased by one dot due to said vectorization.

6. An outline smoothing system for a character output apparatus that prints or displays based on bitmap data, comprising:

a storage device for storing bit map data in a dot matrix format defining a bitmapped font;

a starting point-determining section for determining coordinates of a starting point of said bitmap data, according to predetermined conditions, said starting point being associated with a start of vector data into which said bitmap data is converted, while referring to vectorized dot information indicative of whether or not each dot of said bitmap data has been vectorized;

an orthogonal vector sequence-extracting section for converting said bitmap data to an orthogonal vector sequence by sequentially determining a direction of each adjacent dot of said bitmap data which is located next to a corresponding preceding dot, starting from said starting point, according to a predetermined order, and converting said each adjacent dot of said bitmap data into a vector of a direction of any of upward, downward, leftward, and rightward directions, with reference to said determined direction, while at the same time updating said vectorized dot information;

a diagonal-vectorization section for converting said orthogonal vector sequence to a diagonal vector sequence based on each sequence of a predetermined number of vectors of said orthogonal vector sequence, with reference to a diagonalization table defining in advance predetermined patterns of said each of sequence which is to be applied for converting a vector of said diagonal vector sequence to a diagonal vector;

a line-drawing section for carrying out line-drawing processing by producing bitmap coordinate points based on said starting point and said diagonal vector sequence and correcting said bit map coordinate points with reference to a correction data table defining in advance amounts of correction in units of dots in a manner associated with the patterns of each sequence predetermined number of vectors of said diagonal vector sequence; and a bitmap data-producing section for producing new bitmap data based on line data representative of results of said line-drawing processing, said line data being formed by execution of processing of aforementioned sections until said starting point-determining section can determine no more starting point;

wherein said line-drawing section includes an outline data-producing section for producing data defining an outline of said character image, and a filling line data-producing section for producing data defining a line for filling an inside thereof with dots by filling processing, and wherein said bitmap data-producing section includes a filling section for carrying out said filling processing, a superposing section for superposing data obtained by said filling processing and said data defining said outline one upon another, and a stroke width-correcting section carrying out stroke width-reducing processing for reducing a stroke width of said character image increased due to said vectorization.

* * * * *